United States Patent
Bremer et al.

(10) Patent No.: US 9,432,172 B2
(45) Date of Patent: Aug. 30, 2016

(54) SYSTEM AND METHOD OF COMMUNICATION USING AT LEAST TWO MODULATION METHODS

(71) Applicant: REMBRANDT WIRELESS TECHNOLOGIES, LP, Arlington, VA (US)

(72) Inventors: Gordon Bremer, Clearwater, FL (US); Paul Schneck, Bala Cynwyd, PA (US)

(73) Assignee: REMBRANDT WIRELESS TECHNOLOGIES, LP, Arlington, VA (US)

(*) Notice: Subject to any disclaimer, the term of this patent is extended or adjusted under 35 U.S.C. 154(b) by 0 days.

(21) Appl. No.: 14/549,064

(22) Filed: Nov. 20, 2014

(65) Prior Publication Data

US 2015/0078425 A1 Mar. 19, 2015

Related U.S. Application Data

(63) Continuation-in-part of application No. 13/899,227, filed on May 21, 2013, which is a continuation of application No. 13/198,568, filed on Aug. 4, 2011, now Pat. No. 8,457,228, which is a continuation of (Continued)

(51) Int. Cl.
| | |
|---|---|
| H04B 1/38 | (2015.01) |
| H04L 5/14 | (2006.01) |
| H04L 27/00 | (2006.01) |
| H04L 1/20 | (2006.01) |
| H04L 25/02 | (2006.01) |

(52) U.S. Cl.
CPC ............ *H04L 5/1453* (2013.01); *H04L 1/206* (2013.01); *H04L 25/0262* (2013.01); *H04L 27/0008* (2013.01)

(58) Field of Classification Search
CPC . H04L 5/1453; H04L 27/0008; H04L 1/206; H04L 25/0262
See application file for complete search history.

(56) References Cited

U.S. PATENT DOCUMENTS

| | | | |
|---|---|---|---|
| 3,736,528 A | 5/1973 | Acker et al. | |
| 3,761,840 A | 9/1973 | Bremer | |
| 3,970,926 A | 7/1976 | Rigby et al. | |
| 4,091,422 A | 5/1978 | Amster | |

(Continued)

OTHER PUBLICATIONS

"Conelrad Emergency Radio Notification System Born in 1951", www.modestoradiomuseum.org, Accessed on Dec. 5, 2010, 2 pages.

(Continued)

*Primary Examiner* — Dac Ha
(74) *Attorney, Agent, or Firm* — Condo Roccia Koptiw LLP

(57) ABSTRACT

Methods and systems are provided for simple cable phone and internet (SCPI) device that may be coupled with a cable modem (CM) and one or more SCPI head ends, e.g., via an SCPI access point. The CM may be capable of communicating a first modulated signal with a cable modem termination system (CMTS), via the SCPI device. The SCPI device may be capable of combining a second modulated signal to the first modulated signal thereby generating a combined signal. The SCPI device may be capable of sending the combined signal comprising the first modulated signal and the second modulated signal to the CMTS and an SCPI head end. The SCPI head end may be capable of processing the combined signal and extract information and/or data associated with a service. The SCPI head end may deliver the extracted information and/or data to an appropriate gateway.

3 Claims, 17 Drawing Sheets

Related U.S. Application Data application No. 12/543,910, filed on Aug. 19, 2009, now Pat. No. 8,023,580, which is a continuation of application No. 11/774,803, filed on Jul. 9, 2007, now Pat. No. 7,675,965, which is a continuation of application No. 10/412,878, filed on Apr. 14, 2003, now Pat. No. 7,248,626, which is a continuation-in-part of application No. 09/205,205, filed on Dec. 4, 1998, now Pat. No. 6,614,838.

(60) Provisional application No. 60/067,562, filed on Dec. 5, 1997.

(56) References Cited

U.S. PATENT DOCUMENTS

| | | | |
|---|---|---|---|
| 4,335,464 | A | 6/1982 | Armstrong et al. |
| 4,381,546 | A | 4/1983 | Armstrong |
| 4,464,767 | A | 8/1984 | Bremer |
| 4,503,545 | A | 3/1985 | Bremer et al. |
| 4,509,171 | A | 4/1985 | Bremer et al. |
| 4,516,216 | A | 5/1985 | Armstrong |
| 4,525,846 | A | 6/1985 | Bremer et al. |
| 4,525,847 | A | 6/1985 | Bremer |
| 4,532,640 | A | 7/1985 | Bremer et al. |
| 4,630,286 | A | 12/1986 | Betts |
| 4,645,871 | A | 2/1987 | Bremer et al. |
| 4,654,807 | A | 3/1987 | Bremer |
| 4,663,766 | A | 5/1987 | Bremer |
| 4,677,625 | A | 6/1987 | Betts et al. |
| 4,782,498 | A | 11/1988 | Copeland, III |
| 4,811,357 | A | 3/1989 | Betts et al. |
| 4,862,464 | A | 8/1989 | Betts et al. |
| 4,924,516 | A | 5/1990 | Bremer et al. |
| 4,926,448 | A | 5/1990 | Kraul et al. |
| 4,939,748 | A | 7/1990 | Betts et al. |
| 5,008,903 | A | 4/1991 | Betts et al. |
| 5,050,536 | A | 9/1991 | Baker |
| 5,070,536 | A | 12/1991 | Mahany et al. |
| 5,081,647 | A | 1/1992 | Bremer |
| 5,099,478 | A | 3/1992 | Bremer et al. |
| 5,168,535 | A | 12/1992 | Laor |
| 5,206,854 | A | 4/1993 | Betts et al. |
| 5,230,010 | A | 7/1993 | Betts et al. |
| 5,239,306 | A | 8/1993 | Siwiak et al. |
| 5,239,607 | A | 8/1993 | da Silva et al. |
| 5,251,236 | A | 10/1993 | Brehmer et al. |
| 5,251,328 | A | 10/1993 | Shaw |
| 5,257,396 | A | 10/1993 | Auld, Jr. et al. |
| 5,280,503 | A | 1/1994 | Betts et al. |
| 5,311,557 | A | 5/1994 | Betts et al. |
| 5,311,578 | A | 5/1994 | Bremer et al. |
| 5,345,332 | A | 9/1994 | daSilva et al. |
| 5,355,362 | A | 10/1994 | Gorshe et al. |
| 5,373,149 | A | 12/1994 | Rasmussen |
| 5,392,154 | A | 2/1995 | Chang et al. |
| 5,412,651 | A | 5/1995 | Gorshe |
| 5,414,540 | A | 5/1995 | Patel et al. |
| 5,436,930 | A | 7/1995 | Bremer et al. |
| 5,444,704 | A | 8/1995 | Henderson et al. |
| 5,448,555 | A | 9/1995 | Bremer et al. |
| 5,450,456 | A | 9/1995 | Mueller |
| 5,473,675 | A | 12/1995 | Chapman et al. |
| 5,475,713 | A | 12/1995 | Bremer et al. |
| 5,506,866 | A | 4/1996 | Bremer et al. |
| 5,513,212 | A | 4/1996 | Bremer |
| 5,513,213 | A | 4/1996 | Patel et al. |
| 5,521,942 | A | 5/1996 | Betts et al. |
| 5,530,718 | A | 6/1996 | Gradeler et al. |
| 5,537,398 | A | 7/1996 | Siwiak |
| 5,537,411 | A | 7/1996 | Plas |
| 5,537,436 | A | 7/1996 | Bottoms et al. |
| 5,540,456 | A | 7/1996 | Meier-Burkamp et al. |
| 5,548,222 | A | 8/1996 | Jensen et al. |
| 5,550,881 | A | 8/1996 | Sridhar et al. |
| 5,559,791 | A | 9/1996 | Bremer et al. |
| 5,559,792 | A | 9/1996 | Bottoms et al. |
| 5,559,810 | A | 9/1996 | Gilbert et al. |
| 5,563,883 | A | 10/1996 | Cheng |
| 5,570,295 | A | 10/1996 | Isenberg et al. |
| 5,577,087 | A | 11/1996 | Furuya |
| 5,602,869 | A | 2/1997 | Scott |
| 5,629,992 | A | 5/1997 | Amersfoort et al. |
| 5,642,379 | A | 6/1997 | Bremer |
| 5,651,114 | A | 7/1997 | Davidson, Jr. |
| 5,661,718 | A | 8/1997 | Bremer et al. |
| 5,671,250 | A | 9/1997 | Bremer et al. |
| 5,684,825 | A | 11/1997 | Ko |
| 5,684,834 | A | 11/1997 | Betts et al. |
| 5,706,428 | A | 1/1998 | Boer et al. |
| 5,711,012 | A | 1/1998 | Bottoms et al. |
| 5,719,922 | A | 2/1998 | Bremer et al. |
| 5,719,923 | A | 2/1998 | Bremer et al. |
| 5,748,811 | A | 5/1998 | Amersfoort et al. |
| 5,764,699 | A | 6/1998 | Needham et al. |
| 5,793,800 | A | 8/1998 | Jylha et al. |
| 5,805,669 | A | 9/1998 | Bingel et al. |
| 5,805,755 | A | 9/1998 | Amersfoort et al. |
| 5,812,537 | A | 9/1998 | Betts et al. |
| 5,825,517 | A | 10/1998 | Antoniades et al. |
| 5,828,657 | A | 10/1998 | Betts et al. |
| 5,841,500 | A | 11/1998 | Patel |
| 5,844,944 | A | 12/1998 | Betts et al. |
| 5,859,877 | A | 1/1999 | Betts et al. |
| 5,881,047 | A | 3/1999 | Bremer et al. |
| 5,881,142 | A | 3/1999 | Frankel et al. |
| 5,901,205 | A | 5/1999 | Smith et al. |
| 5,915,003 | A | 6/1999 | Bremer et al. |
| 5,936,949 | A | 8/1999 | Pasternak et al. |
| 5,940,438 | A | 8/1999 | Poon et al. |
| 5,960,400 | A | 9/1999 | Bremer |
| 5,963,620 | A | 10/1999 | Frankel et al. |
| 5,999,563 | A | 12/1999 | Polley et al. |
| 6,011,814 | A | 1/2000 | Martinez et al. |
| 6,021,158 | A | 2/2000 | Schurr et al. |
| 6,031,897 | A | 2/2000 | Bremer et al. |
| 6,037,835 | A * | 3/2000 | Smith .......... H04B 1/406 329/316 |
| 6,061,392 | A | 5/2000 | Bremer et al. |
| 6,067,297 | A | 5/2000 | Beach |
| 6,072,779 | A | 6/2000 | Tzannes et al. |
| 6,075,512 | A | 6/2000 | Patel et al. |
| 6,097,858 | A | 8/2000 | Laor |
| 6,097,860 | A | 8/2000 | Laor |
| 6,101,299 | A | 8/2000 | Laor |
| 6,108,347 | A | 8/2000 | Holmquist |
| 6,111,936 | A | 8/2000 | Bremer |
| 6,125,148 | A | 9/2000 | Frodigh et al. |
| 6,134,245 | A | 10/2000 | Scarmalis |
| 6,154,524 | A | 11/2000 | Bremer |
| 6,157,680 | A | 12/2000 | Betts et al. |
| 6,160,790 | A | 12/2000 | Bremer |
| 6,167,031 | A | 12/2000 | Olofsson et al. |
| 6,175,436 | B1 | 1/2001 | Jackel |
| 6,185,083 | B1 | 2/2001 | Mathieu et al. |
| 6,208,663 | B1 | 3/2001 | Schramm et al. |
| 6,212,227 | B1 | 4/2001 | Ko et al. |
| 6,236,481 | B1 | 5/2001 | Laor |
| 6,236,717 | B1 | 5/2001 | Bremer et al. |
| 6,243,391 | B1 | 6/2001 | Holmquist |
| 6,252,644 | B1 | 6/2001 | Patel |
| 6,272,108 | B1 | 8/2001 | Chapman |
| 6,272,154 | B1 | 8/2001 | Bala et al. |
| 6,292,281 | B1 | 9/2001 | Bala et al. |
| 6,307,653 | B1 | 10/2001 | Bala et al. |
| 6,307,893 | B1 | 10/2001 | Bremer et al. |
| 6,307,923 | B1 | 10/2001 | Bremer et al. |
| 6,320,879 | B1 | 11/2001 | Bremer |
| 6,320,993 | B1 | 11/2001 | Laor |
| 6,330,275 | B1 | 12/2001 | Bremer |
| 6,335,992 | B1 | 1/2002 | Bala et al. |
| 6,347,008 | B1 | 2/2002 | Vodhanel |
| 6,348,986 | B1 | 2/2002 | Doucet et al. |
| 6,408,056 | B1 | 6/2002 | Bremer et al. |
| 6,445,733 | B1 | 9/2002 | Zuranski et al. |

(56) References Cited

U.S. PATENT DOCUMENTS

| | | |
|---|---|---|
| 6,470,110 B1 | 10/2002 | Lin |
| 6,480,645 B1 | 11/2002 | Peale et al. |
| 6,493,475 B1 | 12/2002 | Lin |
| 6,529,652 B1 | 3/2003 | Brener |
| 6,535,589 B1 | 3/2003 | Nauman et al. |
| 6,546,090 B1 | 4/2003 | Bremer et al. |
| 6,549,692 B1 | 4/2003 | Harel et al. |
| 6,556,540 B1 | 4/2003 | Mawhinney et al. |
| 6,580,709 B1 | 6/2003 | Gorshe et al. |
| 6,580,785 B2 | 6/2003 | Bremer et al. |
| 6,591,029 B1 | 7/2003 | Lin et al. |
| 6,597,827 B1 | 7/2003 | Brener et al. |
| 6,603,894 B1 | 8/2003 | Pu |
| 6,614,838 B1 | 9/2003 | Bremer |
| 6,628,857 B1 | 9/2003 | Bonadeo et al. |
| 6,631,119 B1 | 10/2003 | Mawhinney et al. |
| 6,633,693 B1 | 10/2003 | Peale et al. |
| 6,647,058 B1 | 11/2003 | Bremer et al. |
| 6,658,096 B2 | 12/2003 | Bremer et al. |
| 6,671,328 B1 | 12/2003 | Poon et al. |
| 6,690,644 B1 | 2/2004 | Gorshe |
| 6,690,849 B1 | 2/2004 | Dadap, Jr. et al. |
| 6,715,124 B1 | 3/2004 | Betts |
| 6,744,883 B1 | 6/2004 | Bingel et al. |
| 6,771,740 B1 | 8/2004 | Bingel |
| 6,775,355 B1 | 8/2004 | Bingel et al. |
| 6,782,094 B1 | 8/2004 | Venz et al. |
| 6,782,096 B1 | 8/2004 | Bremer et al. |
| 6,836,515 B1 | 12/2004 | Kay et al. |
| 6,885,730 B1 | 4/2005 | Bremer |
| 6,922,415 B1 | 7/2005 | Bremer et al. |
| 6,950,444 B1 | 9/2005 | Holmquist et al. |
| 6,970,501 B1 | 11/2005 | Bremer et al. |
| 7,006,445 B1 | 2/2006 | Cole et al. |
| 7,013,421 B2 | 3/2006 | Betts |
| 7,020,266 B2 | 3/2006 | Bremer et al. |
| 7,023,829 B1 | 4/2006 | Holmquist et al. |
| 7,035,380 B1 | 4/2006 | Bingel et al. |
| 7,046,798 B2 | 5/2006 | Betts et al. |
| 7,058,833 B1 | 6/2006 | Bremer et al. |
| 7,065,205 B1 | 6/2006 | Bingel et al. |
| 7,127,048 B2 | 10/2006 | Bremer et al. |
| 7,127,734 B1* | 10/2006 | Amit ............ H04L 12/2801 348/E7.05 |
| 7,130,338 B2 | 10/2006 | Bremer et al. |
| 7,155,016 B1 | 12/2006 | Betts et al. |
| 7,170,867 B2 | 1/2007 | O'Toole et al. |
| 7,248,626 B2 | 7/2007 | Bremer |
| 7,272,215 B2 | 9/2007 | Bremer et al. |
| 7,289,604 B2 | 10/2007 | Bremer |
| 7,289,610 B2 | 10/2007 | Bremer et al. |
| 7,352,803 B2 | 4/2008 | Bremer et al. |
| 7,471,777 B2 | 12/2008 | Bremer et al. |
| 7,675,965 B2 | 3/2010 | Bremer |
| 7,707,446 B2 | 4/2010 | Bremer et al. |
| 7,711,109 B2 | 5/2010 | Betts et al. |
| 7,747,000 B2 | 6/2010 | Bremer et al. |
| 8,023,580 B2 | 9/2011 | Bremer |
| 8,457,228 B2 | 6/2013 | Bremer |
| 2001/0022836 A1 | 9/2001 | Bremer et al. |
| 2002/0041662 A1 | 4/2002 | Bremer et al. |
| 2002/0167949 A1 | 11/2002 | Bremer et al. |
| 2003/0039348 A1 | 2/2003 | Bremer et al. |
| 2003/0210773 A1 | 11/2003 | Bremer et al. |
| 2003/0210779 A1 | 11/2003 | Bremer et al. |
| 2004/0013183 A1 | 1/2004 | Bremer |
| 2004/0042510 A1 | 3/2004 | Bremer et al. |
| 2004/0052361 A1 | 3/2004 | Betts et al. |
| 2004/0066929 A1 | 4/2004 | Bremer et al. |
| 2004/0081233 A1 | 4/2004 | Bremer et al. |
| 2004/0179662 A1 | 9/2004 | Bremer et al. |
| 2004/0213170 A1 | 10/2004 | Bremer |
| 2004/0258236 A1 | 12/2004 | Bremer et al. |
| 2005/0025153 A1 | 2/2005 | Bremer et al. |
| 2005/0074057 A1 | 4/2005 | Bremer et al. |
| 2005/0147158 A1 | 7/2005 | Bremer et al. |
| 2005/0152404 A1 | 7/2005 | Holmquist et al. |
| 2005/0163303 A1 | 7/2005 | Bremer et al. |
| 2005/0180545 A1 | 8/2005 | Bremer |
| 2006/0188088 A1 | 8/2006 | Bingel et al. |
| 2006/0193465 A1 | 8/2006 | Betts et al. |
| 2006/0195712 A1 | 8/2006 | Bremer et al. |
| 2007/0047730 A1 | 3/2007 | Bremer et al. |
| 2007/0047733 A1 | 3/2007 | Bremer et al. |
| 2007/0286187 A1 | 12/2007 | Bremer et al. |
| 2008/0013608 A1 | 1/2008 | Bremer |
| 2008/0018427 A1* | 1/2008 | Ezra ............ H04L 1/22 340/7.32 |
| 2008/0019432 A1 | 1/2008 | Bremer et al. |
| 2009/0111422 A1 | 4/2009 | Bremer et al. |
| 2009/0262911 A1 | 10/2009 | Bremer et al. |
| 2009/0262912 A1 | 10/2009 | Bremer et al. |
| 2010/0183055 A1 | 7/2010 | Bremer |
| 2010/0246598 A1 | 9/2010 | Bremer et al. |
| 2013/0070825 A1* | 3/2013 | Chapman ............ H04L 12/2801 375/222 |
| 2013/0088993 A1* | 4/2013 | Nielsen ............ H04B 3/50 370/252 |
| 2013/0094416 A1* | 4/2013 | Ling ............ G06F 1/3209 370/311 |
| 2014/0169502 A1* | 6/2014 | Lovell ............ H04L 5/0007 375/324 |

OTHER PUBLICATIONS

Federal Communications Commission(FCC), "Emergency Alert System", Public Safety and Homeland Security Bureau, www.fcc.gov/pshs/services/eas, Accessed on Dec. 5, 2010, 2 pages.

"Specialized Communications Techniques for the Radio Amateur", The American Radio Relay League, Inc., 1975, 1st Edition, Chapter 4, 78-83.

"Specialized Communications Techniques for the Radio Amateur", The American Radio Relay League, Inc., 1975, 1st Edition, Chapter 5, 99-113.

Bates (Ed.), "Broadband Telecommunications Handbook", McGraw-Hill Publishing, NY, 2000, Chapter 9, 128, 129, 131, 132, 133 and 134.

Benson (Ed.), "Television Engineering Handbook", McGraw-Hill Publishers, NY, 1992, 4.14, 4.15, 4.24, 4.34 and 4.35.

Bluetooth®, "Specification of the Bluetooth System, Master Table of Contents & Compliance Requirements", Specification vol. 0, Nov. 4, 2004, V2.0, 1-1230.

Bluetooth®, "Specification of the Bluetooth System, Core", Dec. 1, 1999, V1.0B, 1-1082.

Bluetooth®, "Specification of the Bluetooth System, Profiles", Specification vol. 2, Dec. 1, 1999, V1.0B, 1-440.

Chorafas (Ed.), "Telephony: Today and Tomorrow", Prentice-Hall, Inc., NJ, 1984, Chapter 15, 191-197.

Erickson (Ed.), "Options for Presentation of Multilingual Text: Use of the Unicode Standard", Mar. 14, 1997, 20 pages.

Freeman (Ed.), "Telecommunications Systems Engineering: Analog and Digital Network Design", John Wiley and Sons, Inc., NY, 1980, 180.

Goodman (Ed.), "Radio Amateur's Handbook", The American Radio Relay League, Inc., CN, 1965, Chapter 10, 291-295.

Green (Ed.), "RTTY Handbook", Tab Books, 1972, Chapter 4, 266-273.

IEEE Information Technology, "Wireless LAN Medium Access Control (MAC) and Physical Layer (PHY) Specifications", 1997, 1-466.

Jurgen (Ed.), "Digital Consumer Electronics Handbook", McGraw-Hill Publications, NY, 1997, 27.7-27.10.

Kuecken (Ed.), "Talking Computers and Telecommunications", Van Nostrand Reinhold Company, Inc., NY, 1983, 32-36.

Margulies (Ed.), "SCSA Book", Telecom Library, Inc., NJ, 1993, Chapter 8, 250.

Martin (Ed.), "Telecommunications and the Computer", Prentice-Hall, Inc., NJ, 2nd Edition, 1976, Chapter 21, 410-423.

(56) References Cited

OTHER PUBLICATIONS

Mazda, (Ed.), "Electronics Engineer's Reference Book", 5.sup.th Edition, Butterworth and Company Publishers, London, 1983, 54.5-54.8.
Newton (Ed.), "Newton's Telecom Dictionary", Flatiron Publications, Inc., NY, Apr. 1994, 7th Edition, 9, 363, 364, 426, 427, 428, 429 and 430.
Pallott and Miller, "Implementing Message Priority Polices Over an 802.11 Based Mobile Ad Hoc Network", IEEE, Military Communications Conference, 2001, MILCOM 2001, Communications for Network-Centric Operations: Creating the Information Force, Oct. 28-31, 2001, 2, 860-864.
The National Association for Amateur Radio (ARRL), Radioteletype (RTTY), "Basic Principles and Machines", Chapter 2.1, Book or Journal Title Unknown, Date Unknown, pp. 13 and 14.
The National Association for Amateur Radio (ARRL), Radioteletype (RTTY), "Autostart", Chapter 3.4, "references", Chapter 8, Book or Journal Title Unknown, Date Unknown, pp. 107-111, 183, 185, 186 and 187.
Rzeszewski (Ed.), "Color Television", IEEE Press, John Wiley and Sons, Inc, NY, 1983, 3, 8 and 9.
Shrader (Ed.), "Electronic Communication", McGraw-Hill Publishers, NY, 1959, 551-555.
Shrader (Ed.), "Electronic Communication", McGraw-Hill Publishers, NY, 1959, 519.
Third Generation Partnership Project (3GPP)—Technologies Web Page, http://www.3gpp.org/-technologies-, Accessed on Feb. 8, 2011, 2 pages.
Vilips (Ed.), "Data Modem: Selection and Evaluation Guide", Artech House, Inc, MA, 1972, Section 1, 3 pages.
Wilson et al (Ed.), "The ARRL Handbook for Radio Communications", 64th Edition, The American Radio Relay League, Inc., 1986, Chapter 19, 19-9-19-13.
Wilson et al. (Ed.), "The ARRL Handbook for Radio Communications", 85th Edition, The American Radio Relay League, 2008, Chapter 9, 9.32, 9.33 and 9.34.
Wilson et al. (Ed.), "The ARRL Handbook for Radio Communications", 64th Edition, The American Radio Relay League Inc., 1986, Chapter 14, 14-13 and 14-14.
International Telecommunications Union, Telecommunication Standardization Sector of ITU (ITU-T), Series T: Terminal Equipments and Protocols for Telematic Services, "Procedures for Document Facsimile Transmission in the General Switched Telephone Network", ITU-T Recommendation T.30, Jul. 1996, 176 pages.
International Telecommunications Union, The International Telegraph and Telephone Consultative Committee (CCITT), Data Communication Over the Telephone Network, "A 2-Wire Modem for Facsimile Applications with Rates Up to 14 400 bit/s", Recommendation V.17, Feb. 1991, 13 pages.
International Telecommunications Union, Telecommunication Standardization Sector of ITU (ITU-T), Series T: Terminal Equipments and Protocols for Telematic Services, "Standardization of Group 3 Facsimile Terminals for Document Transmission", ITU-T Recommendation T.4, Jul. 1996, 60 pages.
International Telecommunications Union, Telecommunication Standardization Sector of ITU (ITU-T), Series T: Terminal for Telematic Services, "Standardization of Group 3 Facsimile Terminals for Document Transmission", ITU-T Recommendation T.4-Amendment 1, Jul. 1997, 10 pages.
International Telecommunications Union, Telecommunication Standardization Sector of ITU (ITU-T), Series T: Terminals for Telematic Services, "Standardization of Group 3 Facsimile Terminals for Document Transmission", ITU-T Recommendation T.4-Amendment 2, Oct. 1997, 14 pages.
International Telecommunications Union, Telecommunication Standardization Sector of ITU (ITU-T), Series T: Terminals for Telematic Services, "Procedures for Document Facsimile Transmission in the General Switched Telephone Network", ITU-T Recommendation T.30-Amendment 1, Jul. 1997, 110 pages.
International Telecommunications Union, Telecommunication Standardization Sector of ITU (ITU-T), Series T: Terminals for Telematic Services, "Procedures for Document Facsimile Transmission in the General Switched Telephone Network", ITU-T Recommendation T.30-Amendment 2, Oct. 1997, 18 pages.
Upender et al., "Communication Protocols for Embedded Systems", Embedded Systems Programming, Nov. 1994, vol. 7, Issue 11, 10 pages.

\* cited by examiner

| Type A Modulation Training Signal (with Type A Address) | Type A Modulation Data Signal to Type A Trib | Type A Modulation Trailing Signal |

170

| Type A Modulation Training Signal (with notification of change Type B) | Type B Modulation Data Signal to Type B Trib with Type B address | Type A Modulation Trailing Signal |

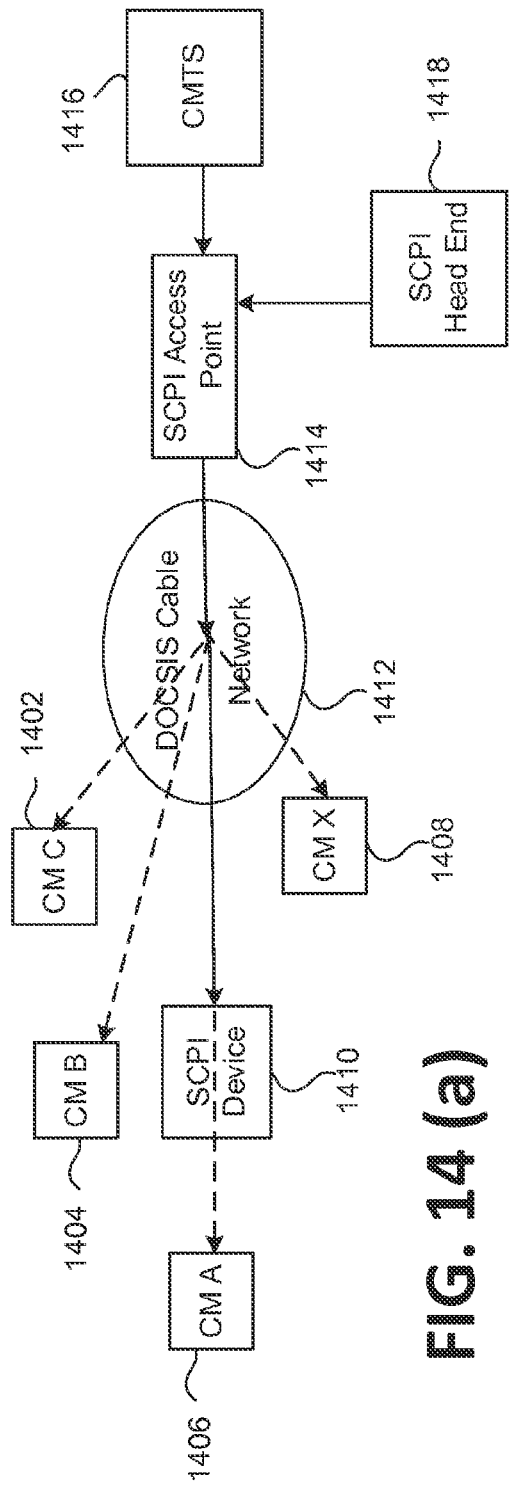 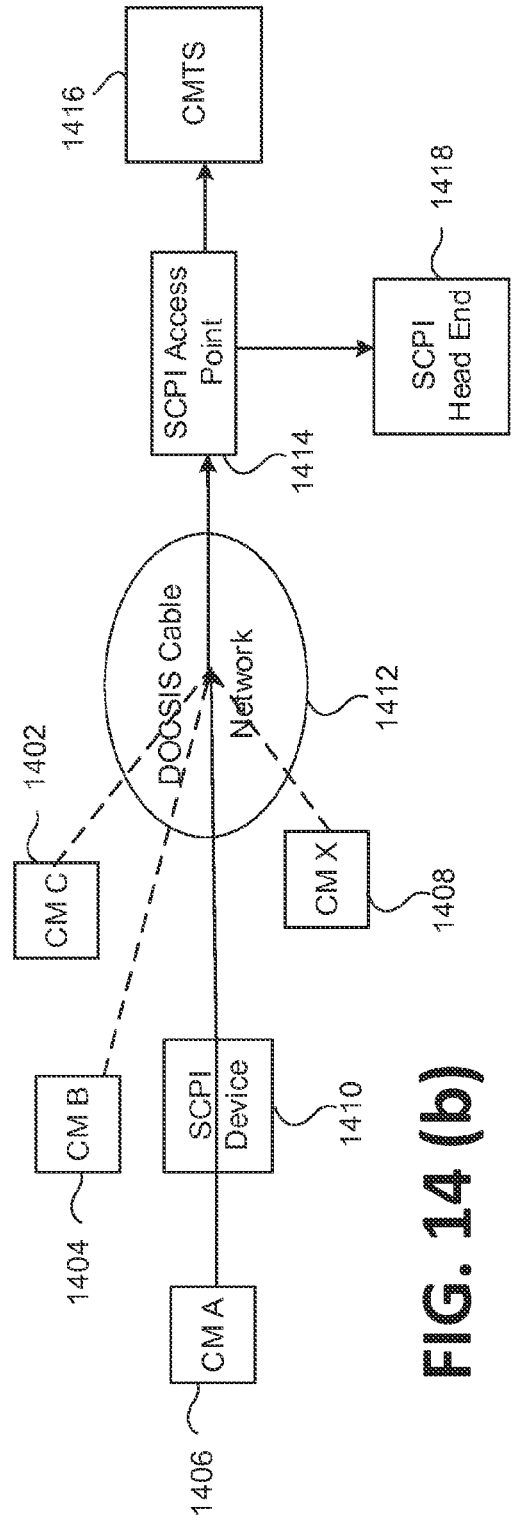
FIG. 14 (a)
FIG. 14 (b)

SYSTEM AND METHOD OF COMMUNICATION USING AT LEAST TWO MODULATION METHODS

CROSS REFERENCE TO RELATED APPLICATIONS

This application is a continuation-in-part of U.S. application Ser. No. 13/899,227 filed on May 21, 2013, which is a continuation of U.S. application Ser. No. 13/198,568 filed on Aug. 4, 2011, which issued as U.S. Pat. No. 8,457,228 on Jun. 4, 2013, which is a continuation of U.S. application Ser. No. 12/543,910 filed on Aug. 19, 2009, which issued as U.S. Pat. No. 8,023,580 on Sep. 20, 2011, which is a continuation of U.S. application Ser. No. 11/774,803, filed on Jul. 9, 2007, which issued as U.S. Pat. No. 7,675,965 on Mar. 9, 2010, which is a continuation of U.S. application Ser. No. 10/412,878, filed Apr. 14, 2003, which issued as U.S. Pat. No. 7,248,626 on Jul. 24, 2007, which is a continuation-in-part of U.S. application Ser. No. 09/205,205, filed Dec. 4, 1998, which issued as U.S. Pat. No. 6,614,838 on Sep. 2, 2003, and which claims priority to and the benefit of the filing date of U.S. Provisional Application No. 60/067,562, filed Dec. 5, 1997, each of which is incorporated by reference herein.

TECHNICAL FIELD

The present invention relates generally to the fields of data communications and modulator/demodulators (modems), and, more particularly, to a data communications system in which a plurality of modulation methods are used to facilitate communication among a plurality of modem types.

BACKGROUND

In existing data communications systems, a transmitter and receiver modem pair can successfully communicate only when the modems are compatible at the physical layer. That is, the modems must use compatible modulation methods. This requirement is generally true regardless of the network topology. For example, point-to-point, dial-up modems operate in either the industry standard V.34 mode or the industry standard V.22 mode. Similarly, in a multipoint architecture, all modems operate, for example, in the industry standard V.27 bis mode. While the modems may be capable of using several different modulation methods, a single common modulation is negotiated at the beginning of a data session to be used throughout the duration of the session. Should it become necessary to change modulation methods, the existing data session is torn down, and anew session is negotiated using the new modulation method. Clearly, tearing down an existing data session causes a significant disruption in communication between the two modems.

As discussed in the foregoing, communication between modems is generally unsuccessful unless a common modulation method is used. In a point-to-point network architecture, if a modem attempts to establish a communication session with an incompatible modem, one or both of the modems will make several attempts to establish the communication link until giving up after a timeout period has expired or the maximum number of retry attempts has been reached. Essentially, communication on the link is impossible without replacing one of the modems such that the resulting modem pair uses a common modulation method.

In a multipoint architecture, a single central, or "master," modem communicates with two or more tributary or "trib" modems using a single modulation method. If one or more of the trib modems are not compatible with the modulation method used by the master, those tribs will be unable to receive communications from the master. Moreover, repeated attempts by the master to communicate with the incompatible trib(s) will disturb communications with compatible trib(s) due to time wasted in making the futile communication attempts.

Thus, communication systems comprised of both high performance and low or moderate performance applications can be very cost inefficient to construct. For example, some applications (e.g., internet access) require high performance modulation, such as quadrature amplitude modulation (QAM), carrier amplitude and phase (CAP) modulation, or discrete multitone (DMT) modulation, while other applications (e.g., power monitoring and control) require only modest data rates and therefore a low performance modulation method. All users in the system will generally have to be equipped with a high performance modem to ensure modulation compatibility. These state of the art modems are then run at their lowest data rates for those applications that require relatively low data throughput performance. The replacement of inexpensive modems with much more expensive state of the art devices due to modulation compatibility imposes a substantial cost that is unnecessary in terms of the service and performance to be delivered to the end user.

Accordingly, what is sought, and what is not believed to be provided by the prior art, is a system and method of communication in which multiple modulation methods are used to facilitate communication among a plurality of modems in a network, which have heretofore been incompatible.

In existing cable TV, cable data and phone services, the TV, data and/or phone services may be provided by utilizing more than one customer premises equipment device, e.g., a cable device, arable service access point, a plain old telephone service (POTS) access point, and/or a cable modem. Installation, usage and maintenance of such systems may be complex and/or expensive.

Accordingly, there may be a need for a system and method of communication that may be utilized to provide integrated cable TV, cable data and phone service using a single low cost, low power, easy to configure customer premises equipment. For example, such a service be provided without need of a separate cable modem.

SUMMARY

The present disclosure includes systems and instrumentalities for communication of data and/or phone services using a single device. As disclosed herein, a cable modem (CM) may be capable of communicating a first modulated signal with a cable modem termination system (CMTS). The first modulated signal may be communicated via a simple cable phone and internet (SCPI) device. The SCPI device may be capable of combining a second modulated signal with the first modulated signal thereby generating a combined signal. The first modulated signal and the second modulated signal may be multiplexed. The SCPI device may be capable of combining the second modulated signal during a silence period. The SCPI device may be capable of sending the combined signal comprising the first modulated signal and the second modulated signal to a CMTS and/or one or more SCPI head ends.

The SCPI head ends may be capable of receiving the combined multiplexed signal from the SCPI device. The SCPI head end may be capable of separating the second modulated signal from the received combined signal. The SCPI head end, connected to one or more gateways, e.g., an POTS gateway, data gateway, etc., may be capable of directing information and/or data associated with the POTS and/or data service to an appropriate gateway (e.g., a POTS gateway and/or a data gateway).

The present invention may have many advantages, a few of which are delineated hereafter as merely examples. One advantage of the present invention may be that it may provide an integration of a plurality of services, previously obtained using multiple devices. A single low power, low cost and easy to configure device that may integrate each of different services, e.g., the existing digital Cable TV service, POTS, voice over internet protocol (VOW) service, and other data services (e.g., used to access internet) is disclosed.

Other features and advantages of the present invention will become apparent to one with skill in the art upon examination of the following drawings and detailed description. It is intended that all such additional features and advantages be included herein within the scope of the present invention.

BRIEF DESCRIPTION OF DRAWINGS

The present invention can be better understood with reference to the following drawings. The components and representations in the drawings are not necessarily to scale, emphasis instead being placed upon clearly illustrating the principles of the present invention. Moreover, in the drawings, like reference numerals designate corresponding parts throughout the several views.

FIG. 8 is a signal diagram for an exemplary transmission according to an embodiment.

FIG. 14(a) is a block diagram of an SCPI-based multipoint system illustrating a downstream communication, e.g., between an SCPI head end and one or more SCPI devices.

FIG. 14(b) is a block diagram of a DOCSIS multipoint system illustrating an upstream communication, e.g., between a SCPI device and a SCPI head end.

DETAILED DESCRIPTION OF ILLUSTRATIVE EMBODIMENTS

Figure 1:
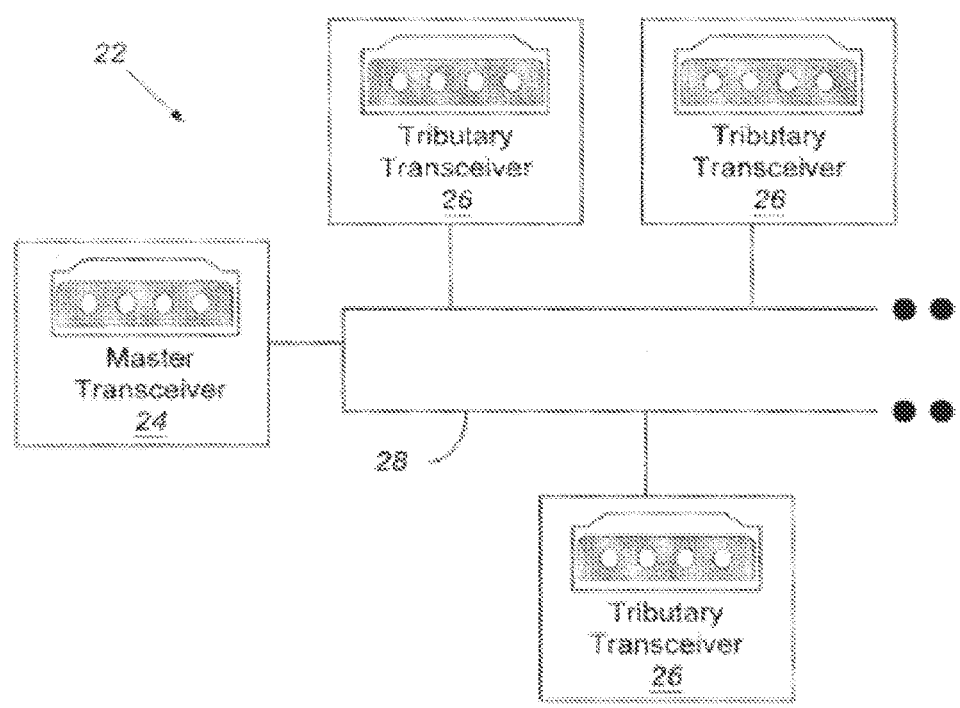
FIG. 1 is a block diagram of a prior art multipoint communication system including a master transceiver and a plurality of tributary transceivers.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

With reference to FIG. 1, a prior art multipoint communication system 22 is shown to comprise a master modem or transceiver 24, which communicates with a plurality of tributary modems (tribs) or transceivers 26-26 over communication medium 28. Note that all tribs 26-26 are identical in that they share a common modulation method with the master transceiver 24. Thus, before any communication can begin in multipoint system 22, the master transceiver and the tribs 26-26 must agree on a common modulation method. If a common modulation method is found, the master transceiver 24 and a single trib 26 will then exchange sequences of signals that are particular subsets of all signals that can be communicated via the agreed upon common modulation method. These sequences are commonly referred to as training signals and can be used for the following purposes: 1) to confirm that the common modulation method is available, 2) to establish received signal level compensation, 3) to establish time recovery and/or carrier recovery, 4) to permit channel equalization and/or echo cancellation, 5) to exchange parameters for optimizing performance and/or to select optional features, and 6) to confirm agreement with regard to the foregoing purposes prior to entering in (o data communication triode between the users. In a multipoint system, the address of the trib with which the master is establishing communication is also transmitted during the training interval. At the end of a data session a communicating pair of modems will typically exchange a sequence of signals known as trailing signals for the purpose of reliably stopping the session and confirming that the session has been stopped. In a multipoint system, failure to detect the end of a session will delay or disrupt a subsequent session.

Figure 2:
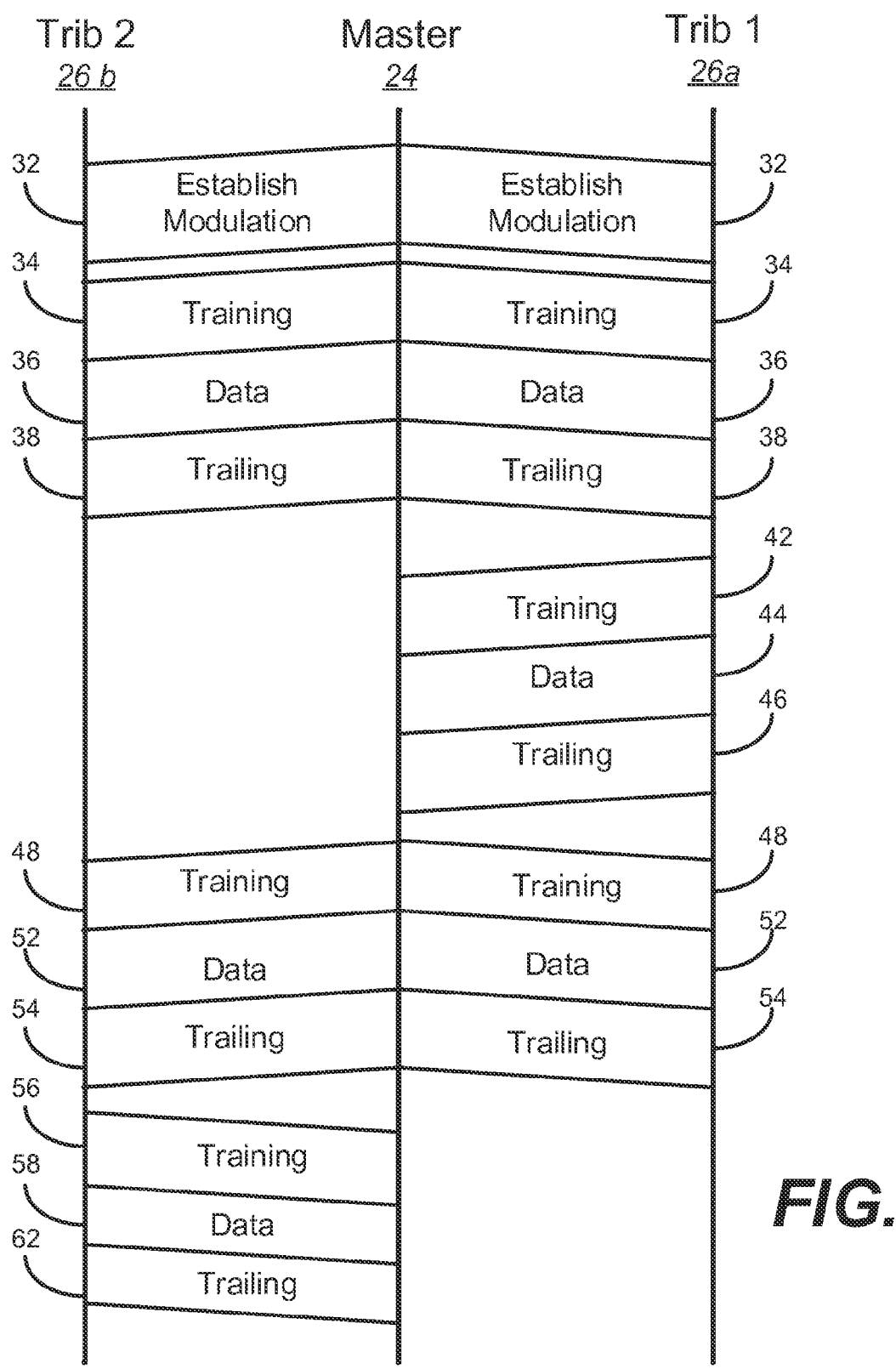
FIG. 2 is a ladder diagram illustrating the operation of the multipoint communication system of FIG. 1.

Referring now to FIG. 2, an exemplary multipoint communication session is illustrated through use of a ladder diagram. This system uses polled multipoint communication protocol. That is, a master controls the initiation of its own transmission to the tribs and permits transmission from a trib only when that trib has been selected. At the beginning of the session, the master transceiver 24 establishes a common modulation as indicated by sequence 32 that is used by both the master 24 and the nibs 26a, 26b for communication. Once the modulation scheme is established among the modems in the multipoint system, the master transceiver 24 transmits a training sequence 34 that includes the address of the trib that the master seeks to communicate with. In this case, the training sequence 34 includes the address of trib 26a. As a result, trib 26b ignores training sequence 34. After completion of the training sequence 34, master transceiver 24 transmits data 36 to trib 26a followed by trailing sequence 38, which signifies the end of the communication session. Similarly, with reference to FIG. 8, the sequence 170 illustrates a Type A modulation training signal, followed by a Type A modulation data signal. Note that trib 26b ignores data 36 and trailing sequence 38 as it was not requested for communication during training sequence 34.

At the end of trailing sequence 38, trib 26a transmits training sequence 42 to initiate a communication session with master transceiver 24. Because master transceiver 24 selected trib 26a for communication as part of training sequence 34, trib 26a is the only modem that will return a transmission. Thus, nib 26a transmits data 44 destined for master transceiver 24 followed by trailing sequence 46 to terminate the communication session.

The foregoing procedure is repeated except master transceiver identifies trib 26b in training sequence 48. In this case, trib 26a ignores the training sequence 48 and the subsequent transmission of data 52 and trailing sequence 54 because it does not recognize its address in training sequence 48. Master transceiver 24 transmits data 52 to trib 26b followed by trailing sequence 54 to terminate the communication session. Similarly, with reference to FIG. 8, sequence 172 illustrates a Type A modulation signal, with notification of a changes to Types B, followed by a Types B modulation data signal. To send information back to master transceiver 24, trib 26b transmits training sequence 56 to establish a communication session. Master transceiver 24 is conditioned to expect data only from trib 26h because trib 26b was selected as part of training sequence 48. Trib 26b transmits data 58 to master transceiver 24 terminated by trailing sequence 62.

The foregoing discussion is based on a two-wire, half-duplex multipoint system. Nevertheless, it should be understood that the concept is equally applicable to four-wire systems.

Consider the circumstance in which master transceiver 24 and trib 26b share a common modulation type A while trib 26a uses a second modulation type B. When master transceiver attempts to establish A as a common modulation during sequence 32, trib 26a will not be able to understand that communication. Moreover, trib 26a will not recognize its own address during training interval 34 and will therefore ignore data 36 and trailing sequence 38. Master transceiver 24 may time out waiting for a response from trib 26a because trib 26a will never transmit training sequence 42, data 44, and trailing sequence 46 due to the failure of trib 26a to recognize the communication request (training sequence 34) from master transceiver 24. Thus, if the tribs in a multipoint communication system use a plurality of modulation methods, the overall communication efficiency will be disrupted as specific tribs will be unable to decipher certain transmissions from the master transceiver and any unilateral transmission by a trib that has not been addressed by the master transceiver will violate the multipoint protocol.

As discussed hereinbefore, however, it is desirable to design a multipoint communication system comprising tribs that use a plurality of modulation methods. For example, one moderately priced trib may be used to communicate at a relatively high data rate for some applications, such as Internet access, while another, lower priced, trib is used to communicate at a lower data rate for other applications, such as power monitoring and control. The needs of these different applications cannot be efficiently met by a single modulation. While it is possible to use high performance tribs running state of the art modulation methods such as QAM, CAP, or DMT to implement both the high and low data rate applications, significant cost savings can be achieved if lower cost tribs using low performance modulation methods are used to implement the lower data rate applications.

Figure 3:
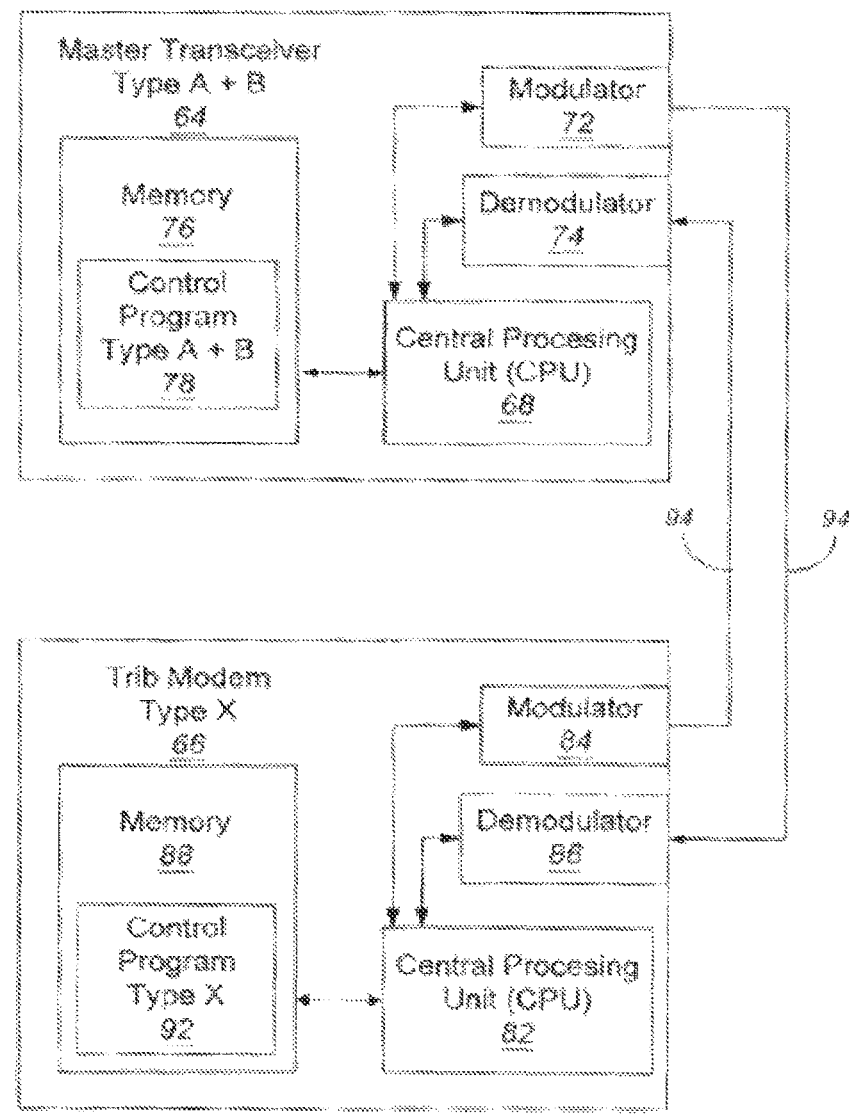
FIG. 3 is a block diagram of a master transceiver and tributary transceiver for use in the multipoint communication system of FIG. 1 in accordance with the principles of the present invention.

A block diagram of a master transceiver 64 in communication with a bib 66 in accordance with the principles of the present invention is shown in FIG. 3. Master transceiver 64 comprises a central processing unit (CPU) 68 in communication with modulator 72, demodulator 74, and memory 76. Memory 76 holds software control program 78 and any data necessary for the operation of master transceiver 64. Control program 78 includes logic for implementing a plurality of modulation methods. For purposes of illustration, control program 78 can implement both a type A and a type B modulation through modulator 72 and demodulator 74.

Trib 66 comprises CPU 82 in communication with modulator 84, demodulator 86, and memory 88. Memory 88, likewise holds software control program 92 and any data necessary for the operation of trill 66. Control programs 78 and 92, are executed by CPUs 68 and 82 and provide the control logic for the processes to be discussed herein. Control program 92 includes logic for implementing a particular modulation method, which, for purposes of illustration, is called type X Inasmuch as master transceiver 64 is capable of running either a type A or a type B modulation method, type X refers to one of those two modulation methods. The master transceiver 64 communicates with trib 66 over communication medium 94.

Figure 4:
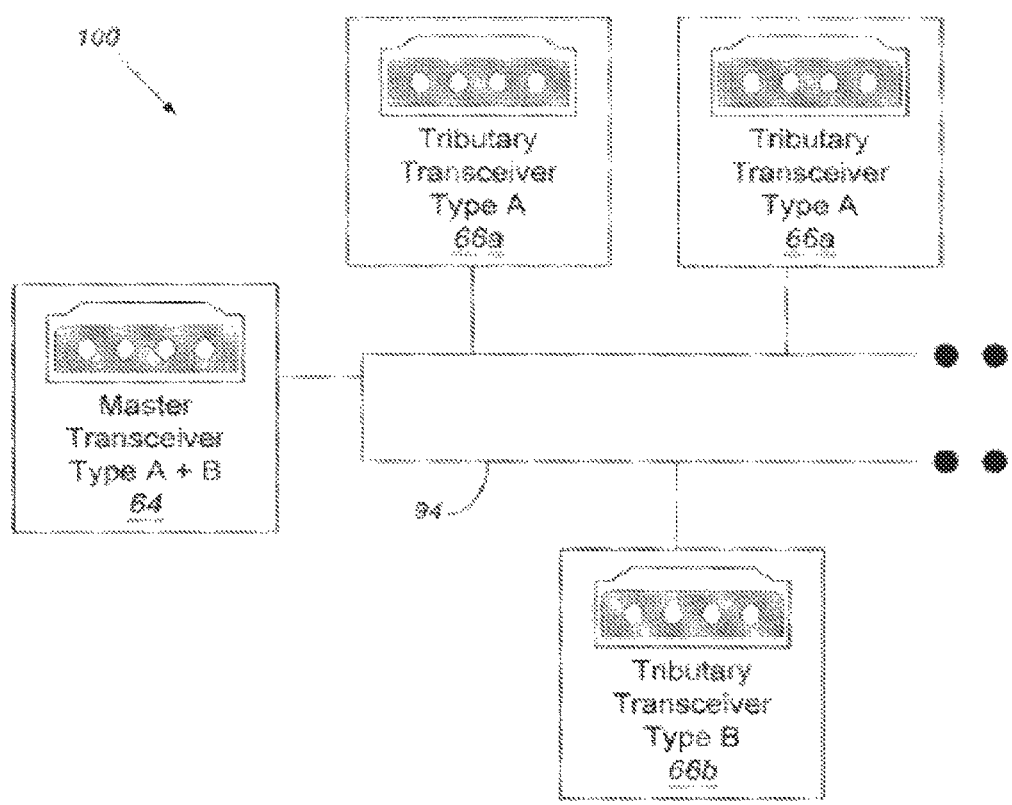
FIG. 4 is a block diagram of a multipoint communication system including the master transceiver and a plurality of tributary transceivers of the type illustrated in FIG. 3.

Referring now to FIG. 4, a multipoint communication system 100 is shown comprising a master transceiver 64 along with a plurality of tribs 66-66. In this example, two tribs 66a-66a run a type A modulation method while one trib 66b runs a type B modulation method. The present invention permits a secondary or embedded modulation method (e.g., type B) to replace the standard modulation method (e.g., type A) after an initial training sequence. This allows the master transceiver 64 to communicate seamlessly with tribs of varying types.

Figure 5:
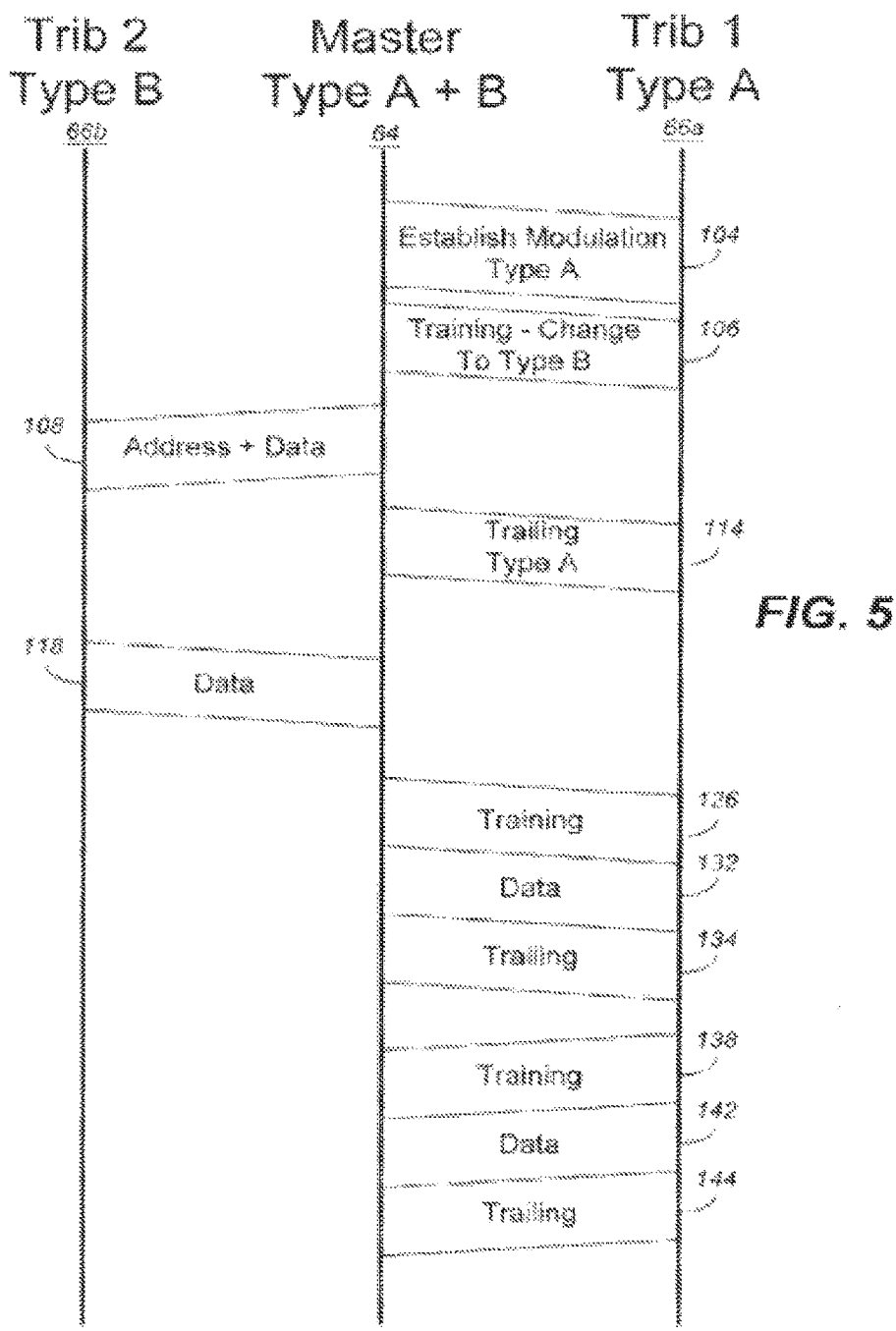
FIG. 5 is a ladder diagram illustrating the operation of the multipoint communication system of FIG. 4.
Figure 6:
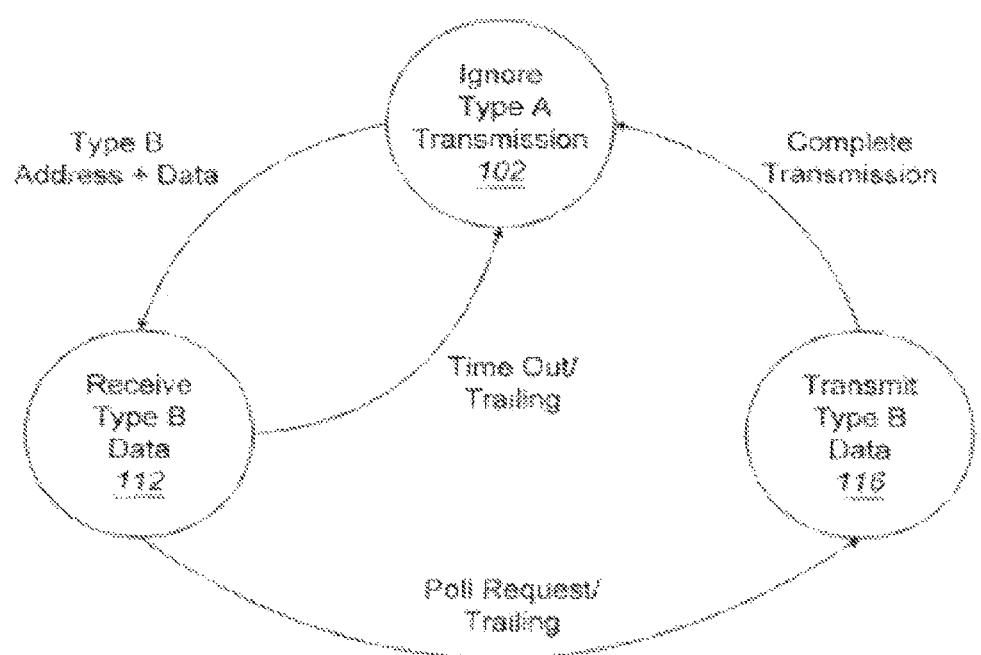
FIG. 6 is a state diagram for a tributary transceiver of FIGS. 3-5 using a secondary modulation method in accordance with the principles of the present invention.

The operation of multipoint communication system 100 will be described hereafter with reference to the ladder diagram of FIG. 5 and the state diagrams of FIGS. 6 and 7. A communication session between the master transceiver 64 and a type B trib 66h will be discussed first. A state diagram for a type B trib 66h is shown in FIG. 6. Type B trib 66b is initialized in state 102 in which type A modulation transmissions are ignored. In the present example, the primary modulation method is type A, thus, as shown in FIG. 5, master transceiver 64 establishes type A as the primary modulation in sequence 104. Note that because trib 66h responds only to type B modulation transmissions, only the type A tribs 66a-66a are receptive to transmission sequence 104.

To switch from type A modulation to type B modulation, master transceiver 64 transmits a training sequence 106 to type A tribs 66a in which these tribs are notified of an impending change to type B modulation. The switch to type B modulation could be limited according to a specific time interval or for the communication of a particular quantity of data. After notifying the type A tribs 66a of the change to type B modulation, master transceiver 64, using type B modulation, transmits data along with an address in sequence 108, which is destined for a particular type B trib 66b. In an example, embedded modulation permits a secondary modulation to replace the usual primary modulation for a user data segment located after a primary training sequence. For example, master transceiver 64 may change to modulation Type B and may convey user information to type B trib 66b. The type B trib 66b targeted by the master transceiver 64 will transition to state 112 as shown in FIG. 6 upon detecting its own address where it processes the data transmitted in sequence 108.

After completing transmission sequence 108, master transceiver 64 transmits a trailing sequence 114 using type A modulation thus notifying all type A tribs 66a that type B modulation transmission is complete. If master transceiver 64 has not transmitted a poll request to the type B trib 66b in sequence 108, then the type B trib 66b that was in communication with the master transceiver 64 will return to state 102 after timing out based on the particular time interval defined for the type B modulation transmission or transfer of the particular quantity of data. Note that the trailing sequence 114 is ineffective in establishing the termination of a communication session between master transceiver 64 and a type B trib 66b because the trailing sequence is transmitted using type A modulation.

If, however, master transceiver 64 transmitted a poll request in sequence 108, then the type B trib 66b transitions to state 116 where it will transmit data, using type B modulation, to master transceiver 64 in sequence 118. After completion of this transmission, the type B trib 66b returns to state 102 where type A transmissions are ignored.

Figure 7:
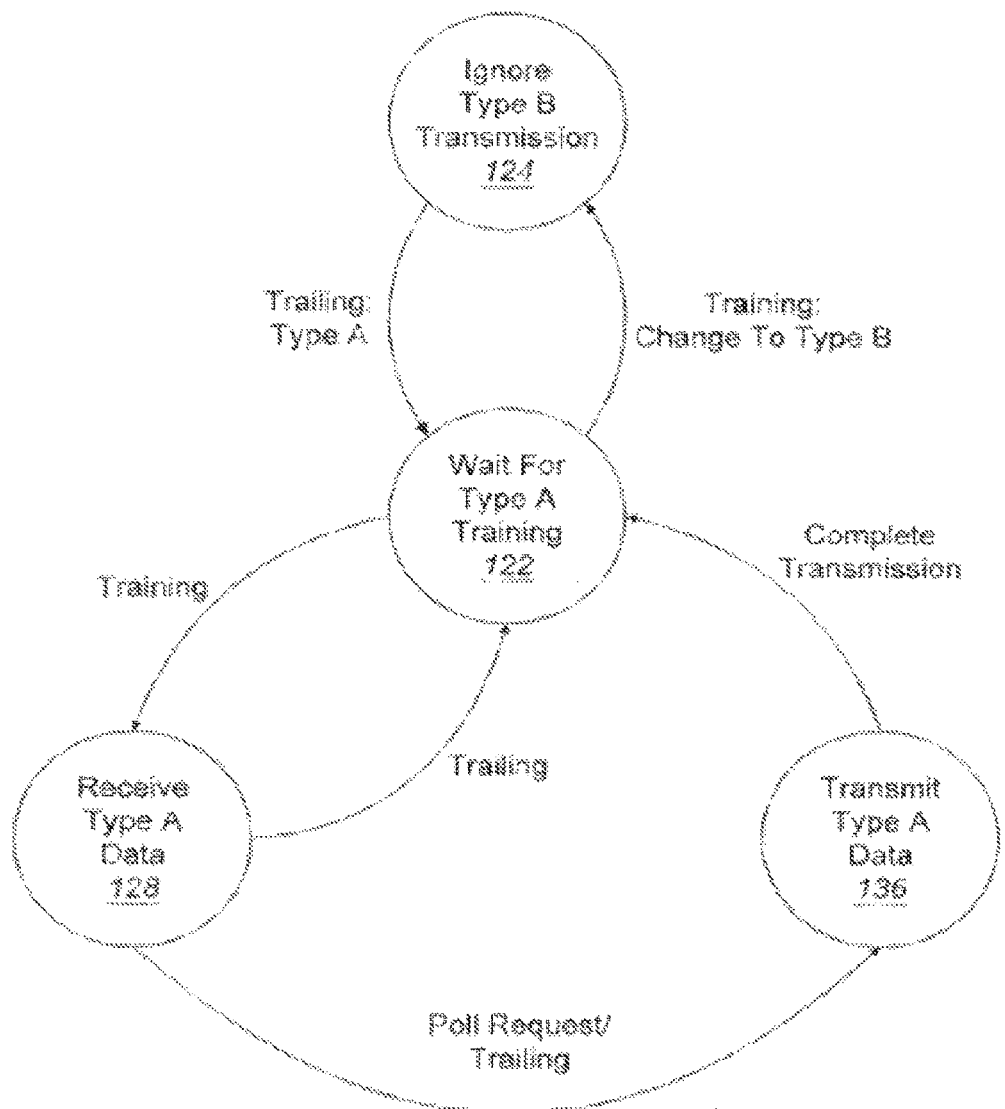
FIG. 7 is a state diagram for a tributary transceiver of FIGS. 3-5 using a primary modulation method in accordance with the principles of the present invention.

With reference to FIG. 5 and FIG. 7, a communication session between the master transceiver 64 and a type A trib 66a will now be discussed. A state diagram for a type A trib 66a is shown in FIG. 7. A type A trib 66a is initialized in state 122 in which it awaits a type A modulation training sequence. If, however, master transceiver transmits a training sequence in which the type A tribs 66a-66a are notified of a change to type B modulation as indicated by sequence 106, then a transition is made to state 124 where all type B transmissions are ignored until a type A modulation trailing sequence (e.g., sequence 114) is detected. Upon detecting the type A trailing sequence, a type A trib 66a returns to state 122 where it awaits a training sequence.

To initiate a communication session with a type A trib 66a, master transceiver 64 transmits a training sequence 126 in which an address of a particular type A trib 66a is identified. The identified type A trib 66a recognizes its own address and transitions to state 128 to receive data from master transceiver 64 as part of sequence 132.

After completing transmission sequence 132, which may include a user data segment transmitted using the usual primary (e.g., type A) modulation, master transceiver 64 transmits a trailing sequence 134 using type A modulation signifying the end of the current communication session. If master transceiver 64 has not transmitted a poll request to the type A trib 66a in sequence 132, then the type A trib 66a that was in communication with the master transceiver 64 will return to state 122 after receiving trailing sequence 134.

If, however, master transceiver 64 transmitted a poll request in sequence 132, then the type A trib 66a transitions to state 136 after receiving trailing sequence 134 where it will transmit training sequence 138, followed by data sequence 142, and terminated by trailing sequence 144 all using type A modulation. After completion of these transmissions, the type A trib 66a returns to state 122 to await the next type A modulation training sequence by master transceiver 64.

The control programs 78 and 92 of the present invention can be implemented in hardware, software, firmware, or a combination thereof. In the preferred embodiment(s), the control programs 78 and 92 are implemented in software or firmware that is stored in a memory and that is executed by a suitable instruction execution system.

The control programs 78 and 92, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

As discussed herein, it is desirable to design a system with an existing customer premises digital cable TV system, an existing cable TV network system with no additional internet access, and a simple cable phone and internet (SCPI) system. The SCPI system may be utilized to provide a low cost, entry-level service at the customer premises. The service may include a plain old telephone service (POTS) and a data service, e.g., utilized for internet access. The POTS and the data service may be bundled within one device. The SCPI customer premises equipment may be a small, inexpensive and plug-n-play device that may be installed by a cable TV/POTS/internet customer. The SCPI customer premises equipment may be installed without existing and/or additional broadband internet access. The SCPI system may be coupled to and may utilize the cable TV system.

Figure 9:
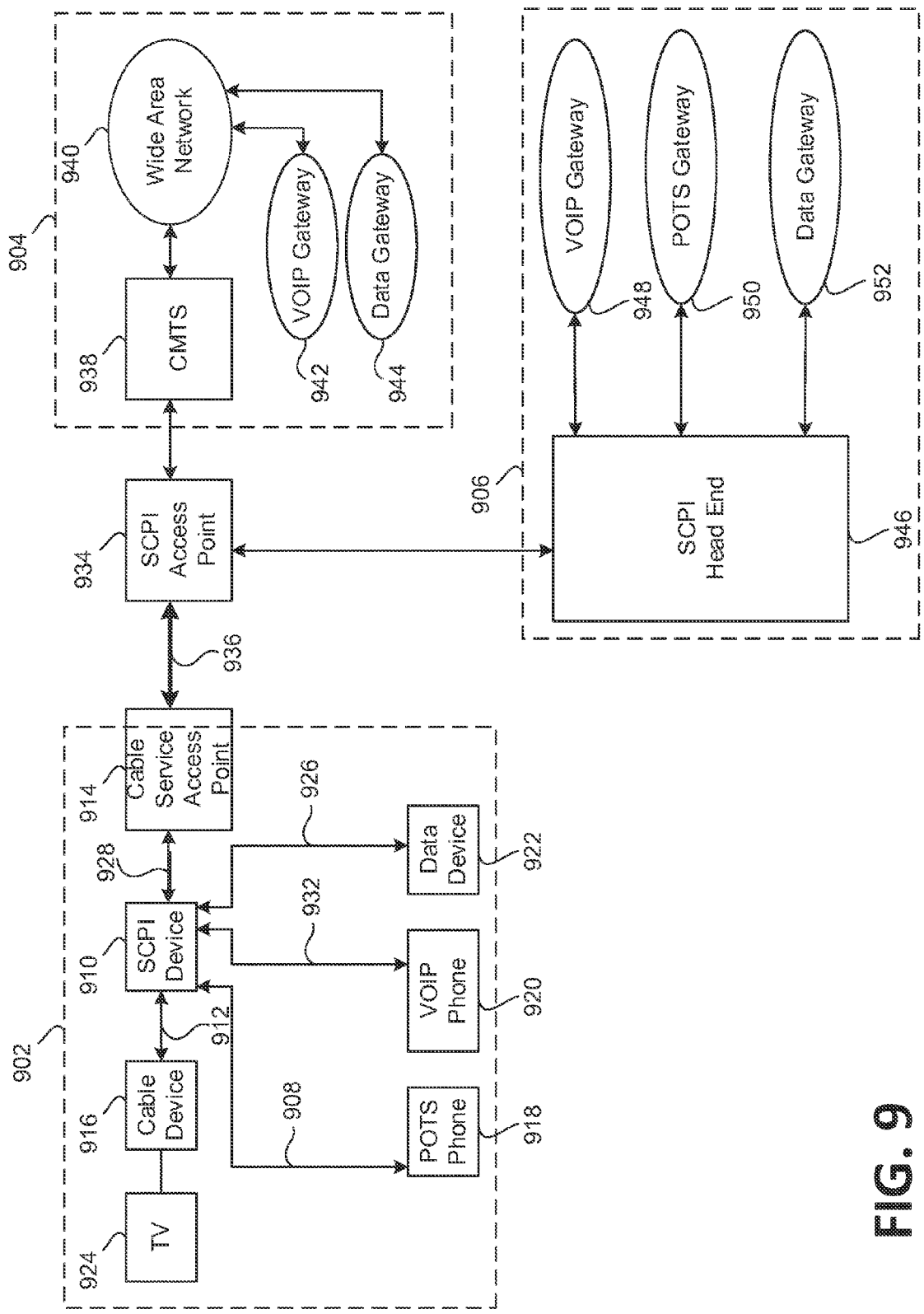
FIG. 9 is a block diagram illustrating one or more components that may be utilized in a customer-installed a simple cable phone and internet (SCPI) communication system.

FIG. 9 is a block diagram illustrating one or more components that may be utilized in a customer-installed SCPI communication system. As illustrated in FIG. 9, a customer premises sub-system 902 may include one or more of a set top cable device 916, a SCPI device 910, a cable service access point 914, a POTS phone 918, a VOIP phone 920, or a data device 922. The SCPI device 910 may be placed in between the cable device 916 and the cable service access point 914. The SCPI device 910 may be coupled electrically coupled using a coaxial cable 912) with the cable device 916. The SCPI device 910 may be coupled with the cable service access point 914, e.g., using a premises coaxial cable 928. The customer premises sub-system may include one or more TVs (e.g., TV 924) and/or cable devices, one or more coax cable splitters, and/or one or more POTS phones.

As illustrated in FIG. 9, a SCPI access point 934 may be utilized to couple the customer premises cable service access point 914 with the cable TV, cable data, and/or cable phone service sub-system 904 and/or an SCPI phone and data services sub-system 906. The SCPI access point 934 may be coupled with the cable service access point 914, e.g., via one of a coaxial cable, an optical fiber, or a hybrid fiber coax network 936. The cable TV, cable data, and/or cable phone service sub-system 904 may include one or more of a cable modem termination system (CMTS) 938, a wide area network 940 coupled with a data gateway 944 (e.g., to provide internet access) and/or a VOIP gateway 942. The SCPI phone and data services sub-system 906 may include one or more of an SCPI head end 946, a VOIP gateway 948, a POTS gateway 950, or a data gateway 952 (e.g., to provide internet access).

As illustrated in FIG. 9, the customer premises SCPI sub-system 902 may allow a digital cable TV customer to operate an existing POTS phone 918 by connecting the POTS phone 918 to the SCPI device 910, e.g., via a POTS interface 908, and the VOIP phone 920, e.g., via an interface 932. The SCPI device 910 may be inserted between the incoming cable service access point 914 (e.g., via a premises coaxial cable 928), and the set top cable device 916 (e.g., via a coaxial cable 912). The SCPI system may be configured to provide POTS service. The SCPI system may be configured to provide advanced telephony feature, e.g., the VOIP service features.

The SCPI system may be configured to communicate data with a device such as a personal computer, for example, to access internet and/or other data services. The data device 922 may connect to the SCPI device 910 using an interface 926, an ethernet interface and/or a USB cable.

The SCPI device 910 may be powered by power conversion of the incoming cable service TV signals from the cable service access point 914 and/or the set top device outgoing signals from the cable device 916. The SCPI device 910 may be powered by an external AC/DC converter such as a USB driver. The SCPI device may be battery powered. The SCPI device may be operated from the cable device power supply, e.g., with a daisy chain adapter.

The SCPI customer premises equipment and system may be of substantially lower cost and simpler to install than a conventional cable modem telephone service. The SCPI customer premises equipment may be of lower cost and may require lower maintenance than conventional POTS service. The installation of a SCPI system may involve installation of a SCPI device. Such installation may be perceived as less complex by customers who may not possess adequate technical skills to install a standalone cable modem. The SCPI may be advantageous to a customer with a single service provider providing a bundle of TV cable service, POTS phone service and/or VOIP phone service, and data service. The SCPI system may provide a service provider with a low cost opportunity to capture new services with the potential to later upgrade the customer to full cable telephone and data service.

Figure 10:
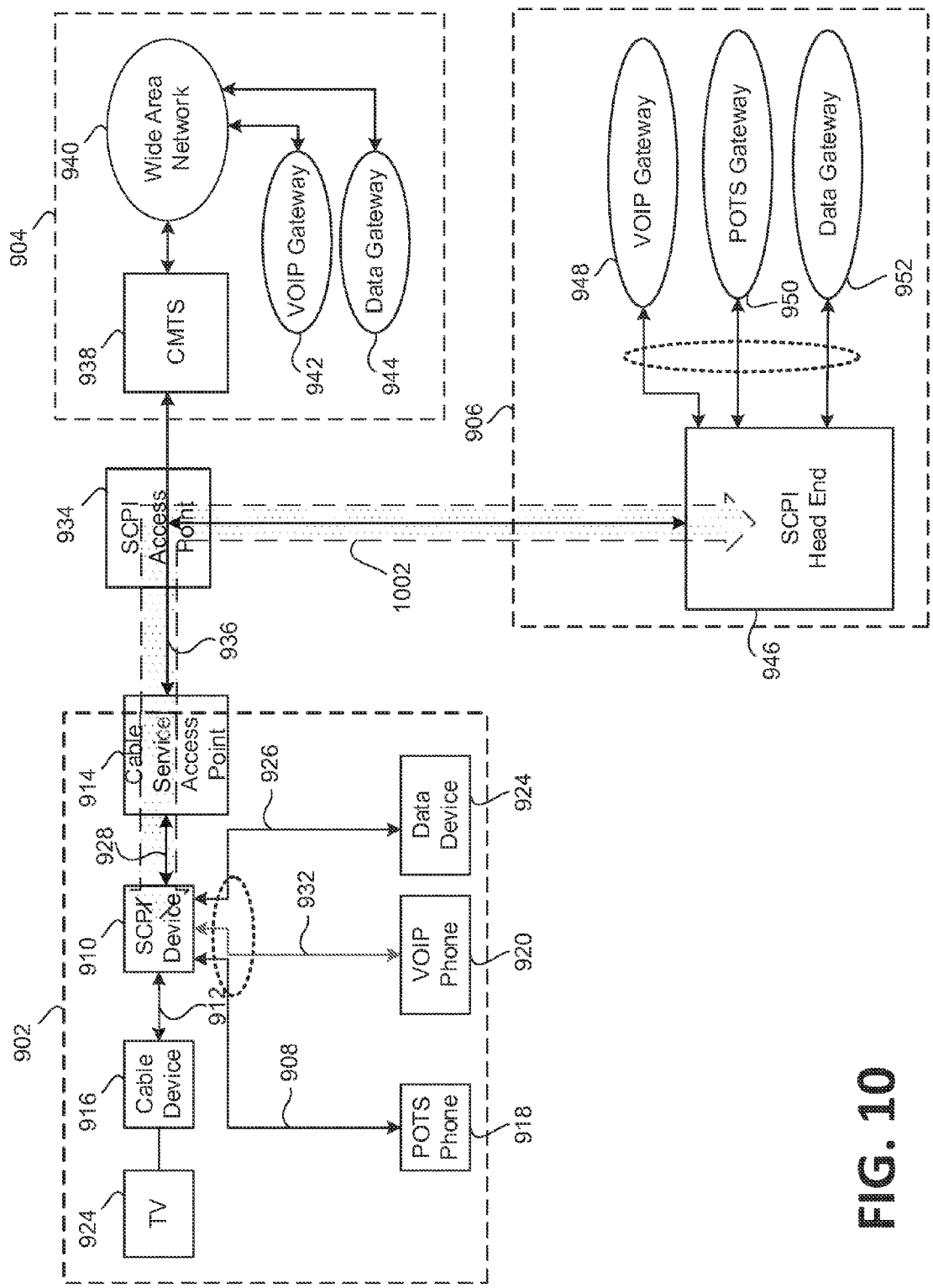
FIG. 10 is a block diagram illustrating a bi-directional SCPI communication channel in a system of FIG. 9.

FIG. 10 is a block diagram illustrating an example of a bi-directional SCPI communication services channel 1002, e.g., between the SCPI device 910 and the SCPI head end 946. Even though only one SCPI head end is shown in FIG. 10, the SCPI device 910 may be connected to a plurality of SCPI head ends. The bi-directional communication channel 1002 may co-exist with an existing digital cable services provided by the cable TV service provider. The bi-directional communication channel 1002 may be independent of the digital cable communication and may be ignored by the CMTS 938. Even though the SCPI access point 934, as illustrated in FIGS. 9 and 10 is depicted outside the SCPI phone and data services sub-system 906, the SCPI access point 934 may be part of the SCPI phone and data services sub-system 906. As illustrated in FIGS. 9 and 10, in a SCPI system, no cable modem may be required. However, if required, a cable modem may be accommodated.

Figure 11:
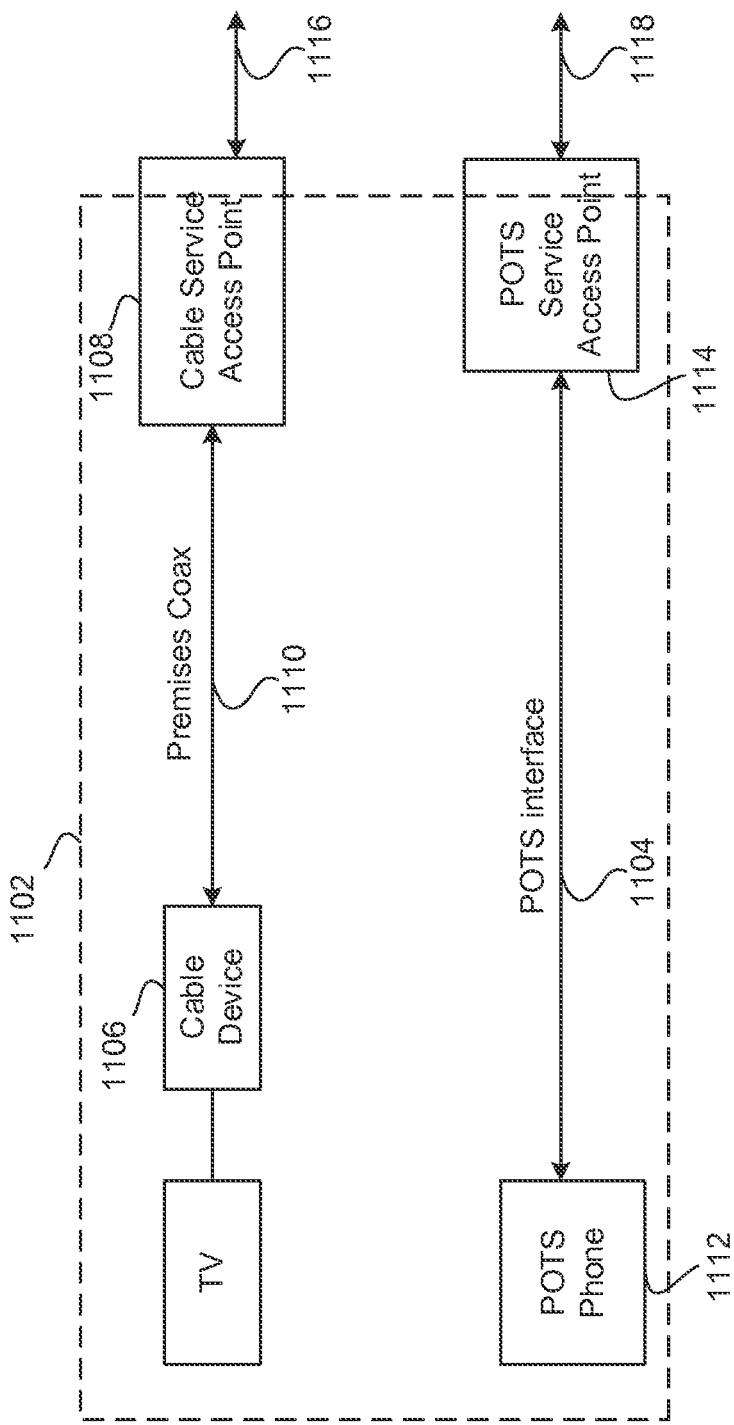
FIG. 11 is a block diagram illustrating a customer premises without using a SCPI device.

FIG. 11 is a block diagram illustrating a customer premises 1102 without using a SCPI device. As illustrated in FIG. 11, a customer may have one or more two) service providers providing a digital cable TV service and a POTS service. As illustrated in FIG. 11, a TV cable device 1106 may be connected to a cable service access point 1108, e.g., via a premises coaxial cable 1110. A POTS phone 1112 may be connected to a POTS service access point 1114 via a POTS interface 1104. Although not shown in the figure, one or more number of TVs, cable devices and coax splitters may be associated with the digital cable TV service via an interface 1116. One or more number of POTS phones may be associated with the POTS phone service via an interface 1118. As illustrated in FIG. 11, a data service (e.g., to access internet) may not be available.

Figure 12:
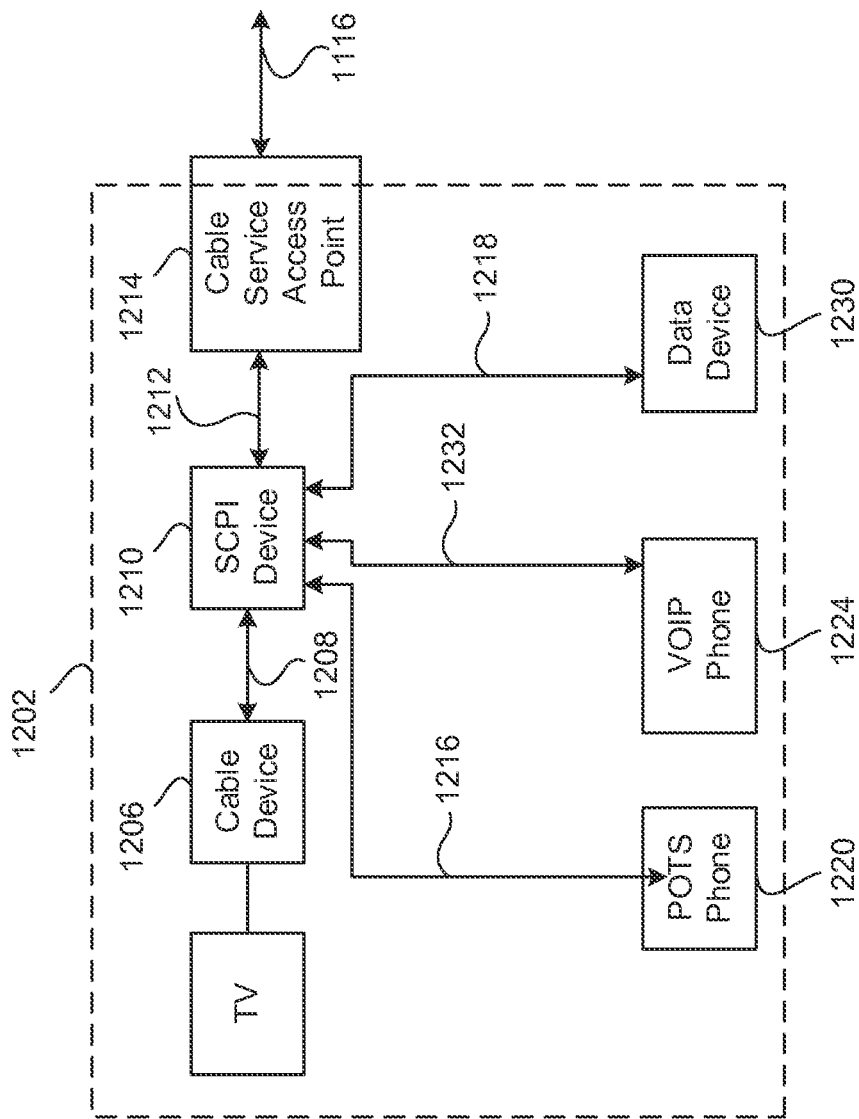
FIG. 12 is a block diagram illustrating a customer premises with a SCPI device.

FIG. 12 is a block diagram illustrating a customer premises 1202 with a SCPI device 1210. An installation of such a system may include coupling a SCPI device 1210 with a cable service access point 1214, e.g., via a premises coaxial cable 1212, and a TV set top device, e.g., a cable device 1206, via a coaxial cable 1208.

As illustrated in FIG. 12, POTS phone 1220 may be connected to SCPI device 1210 via a POTS interface 1216. A telephone service with advanced telephone features may be provided, for example, by connecting a VOIP phone 1224 to the SCPI device 1210 via an interface 1232. A data service may be provided by connecting a data device 1230 (e.g., a personal computer) to the SCPI device 1210 via an interface 1218 (e.g., an ethernet interface and/or a USB cable). A customer using the SCPI customer premises equipment may have an agreement with a single service provider that may provide the cable TV service, POTS, and data service, e.g., to provide internet access.

Figure 13:
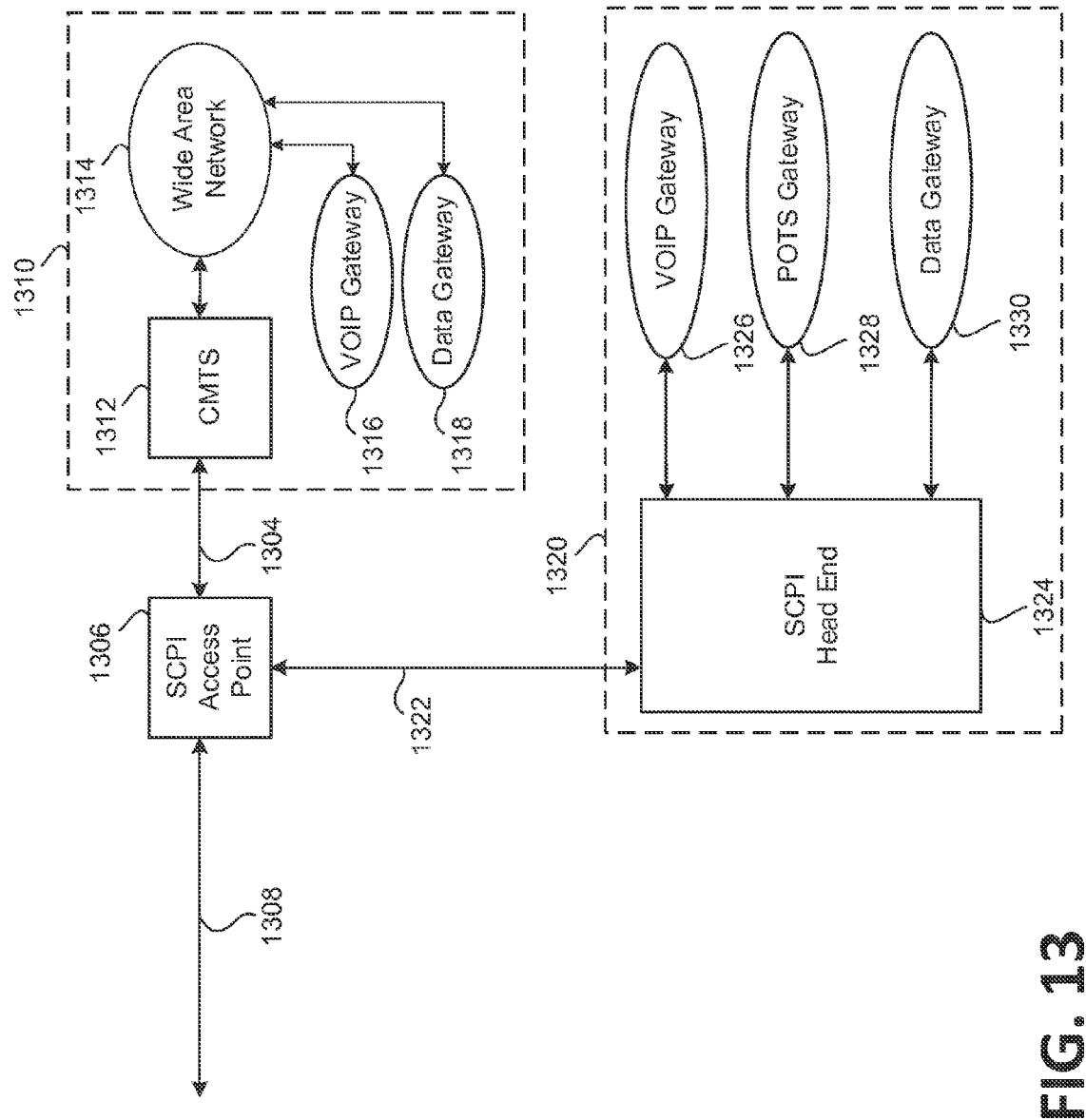
FIG. 13 is a block diagram illustrating integration of cable and SCPI services outside the customer premises.

FIG. 13 is a block diagram illustrating integration of cable and SCPI services outside the customer premises. As illustrated in FIG. 13, a SCPI system including a SCPI access point 1306 connected to a SCPI head end 1324 may be connected to a cable TV network system 1310. The cable TV network system 1310 may include a CMTS 1312. As illustrated in FIG. 13, the CMTS 1312 may be connected, via a wide area network 1314, to a VOIP gateway 1316 and/or a data gateway 1318. The SCPI system including, for example, the SCPI access point 1306 and/or the SCPI phone and data services sub-system 1320 may be complementary to the SCPI customer premises equipment. As illustrated in FIG. 13, the SCPI phone and data services sub-system 1320 may include an SCPI head end 1324 connected to one or more of a VOIP gateway 1326, a POTS gateway 1328, or a data gateway 1330. The SCPI head end 1324 may be capable of extracting and delivering information and/or data associated with one or more services to the respective gateway. For example, the SCPI head end 1324 may be capable of extracting information and/or data associated with a data service. The SCPI head end 1324 may be capable of delivering information and/or data associated with a data service to the data gateway 1330.

As illustrated in FIG. 13, a SCPI access point 1306 may be coupled (e.g., electrically or optically coupled) to a customer premises equipment via a coaxial cable or a hybrid-fiber/coax system 1308. The SCPI access point 1306 may be connected to a cable TV, cable data, and/or cable phone services sub-system 1310, e.g., via an interface 1304. In the upstream direction, the SCPI access point 1306 may buffer the upstream signals. The upstream signals my include a data over cable service interface specification (DOCSIS) and/or SCPI information from the customer premises. The SCPI access point 1306, e.g., via an interface 1322, may send a replica of these upstream signals to the SCPI head end 1324 for processing. The SCPI access point 1306 may not modify the DOCSIS upstream signals destined to the CMTS 1312. In the downstream, the SCPI access point 1306 may accept SCPI downstream signals from the SCPI head end 1324 (e.g., one DOCSIS downstream multiplexed channel per group of customers). The SCPI access point 1306 may embed the downstream signals into multiplexed multicast DOCSIS downstream signals.

As illustrated in FIG. 13, the SCPI head end 1324 may receive DOCSIS and SCPI upstream signals from the SCPI access point 1306. The SCPI head end 1324 may perform signal processing on the received signals to separate and receive the SCPI signals that may be embedded in the DOCSIS signals. The information in the received SCPI signals, for example, digitized voice and associated information and/or data may be delivered to one or more of VOIP gateway 1326 or POTS gateway 1328.

The SCPI head end 1324 may process signals and information from a VoIP gateway 1326 or a POTS gateway 1328 or a data gateway 1330 (e.g., to access internet) addressed to the customer. The information in these signals may be conveyed, in addressed packets for example; through the SCPI access point 1306 over the cable network 1308 in a downstream multiplexed channel. The signals and information may be multi-casted to a plurality of SCPI customers. The signals and information may be addressed to a destination customer SCPI device, e.g., SCPI device 910, as illustrated in FIG. 9.

FIG. 14(*a*) and FIG. 14(*b*) are block diagrams illustrating a SCPI based multipoint system. The SCPI based communication system may be described as a reverse multipoint system with tributaries. As illustrated in FIG. 14(*a*), the reverse multipoint system with tributaries may include a SCPI device 1410 and one or more SCPI head ends.

SCPI device 1410 may communicate with CMTS 1416 and/or SCPI head end 1418, e.g., when the CM (e.g., CM A 1406) communicates with the CMTS 1416. The SCPI device 1410 may communicate via a DOCSIS cable network 1412. The CM may communicate at indicated times and/or events.

As illustrated in FIG. 14(*a*) and FIG. 14(*b*), a SCPI based system may utilize the reverse multipoint system with tributaries to provide one or more services. The SCPI based system may provide an SCPI based communication system that may provide integrated voice and/or data services over a cable communication system, e.g., a digital cable TV system. The SCPI based communication system may provide such services without interfering with the digital cable TV services and/or system. The cable communication system may continue to communicate digital TV information, e.g., to one or more set-top devices, while the SCPI system may communicate telephony and/or data services using the common interface (e.g., a coaxial cable).

FIG. 14(*a*) is a block diagram illustrating downstream communication between an SCPI head end 1418 and a plurality of SCPI devices (e.g., SCPI device 1410). As illustrated in FIG. 14(*a*), the SCPI based system may include one or more of an SCPI device 1410, an SCPI access point 1414, or a SCPI head end 1418. The SCPI based system may include one or more SCPI head ends. In a SCPI based system, downstream DOCSIS signals between a CMTS 1416 and the CMs (e.g., CM A 1406) may pass through the SCPI device 1410 without interfering with the SCPI signals between the SCPI device 1410 and the SCPI head end 1418. Similarly, the upstream SCPI signals between the SCPI device 1410 and the SCPI head end 1418 may be communicated without interfering with the DOCSIS signals from a CM (e.g., CMA 1406) to CMTS 1416. The SCPI signals between the SCPI device 1410 and the SCPI head end 1418 may be separated from the DOCSIS signals (e.g., DOCSIS downstream signals) between the CMTS 1416 and the CMs (e.g., CM A 1406) by multiplexing the SCPI signals with the DOCSIS signals. By using the multiplexing, the independent SCPI signal may not overlap with any of the DOCSIS signals (e.g., DOCSIS downstream channel), and the DOCSIS signals may not overlap with any of the SCPI signals. The DOCIS communication between the CMTS and each of the CMs may remain unchanged.

As illustrated in FIG. 14(*a*), the SCPI downstream information may be a multicast from the SCPI head end 1418 and each of the CMs, e.g., CM A 1406, CM B 1404, CM C 1402, and CM X 1408, and SCPI devices (e.g., SCPI device 1410). The SCPI downstream information may use SCPI multiplexed channel or an SCPI channel. The SCPI signal communicated via the SCPI channel may be ignored by each of the CMs, because of the frequency placement of the SCPI channel. The SCPI Channel signal may be received by each of the SCPI devices, e.g., SCPI device 1410. The SCPI information in the received signal that is addressed to SCPI device 1410 may be processed by the SCPI device 1410 and converted into signals that are delivered to the coupled devices, e.g., a telephone or personal computer (e.g., as illustrated in FIGS. 9 and 10). The SCPI device 1410 may provide analog-digital-analog conversions and interface features, e.g., to intemperate with an analog POTS phone.

FIG. 14(*b*) is a block diagram illustrating upstream communication between an SCPI device 1410 and the SCPI head end 1418. As illustrated in FIG. 14(*b*), the SCPI upstream signal may be a multipoint signal transmitted from the SCPI device 1410 to the CMTS 1416 and/or the SCPI head end 1418. The upstream signals transmitted from the SCPI device 1410 may include a DOCSIS signal bearing DOCSIS information from the attached CM and a SCPI signal bearing SCPI information from the attached devices (e.g., a VOIP phone, a POTS phone, or a PC) to the SCPI head end 1418. The SCPI device 1410, may send SCPI phone and/or SCPI data information upstream.

As illustrated in FIG. 14(*b*), SCPI device 1410 may receive DOCSIS signal and DOCSIS information from an attached CM, e.g., CM A 1406. The SCPI device 1410 may transmit and/or forward the upstream DOCSIS signal and DOCSIS information to CMTS 1416.

SCPI device 1410 may collect the upstream data and/or information to be sent. For example, the upstream data and/or information may include data and/or information associated with one of the attached devices. The SCPI device 1410 may generate a SCPI transmission request. The SCPI transmission request may be internal to the SCPI device. CMTS 1416 may enable a CM, e.g., CM A 1406 coupled to SCPI device 1410, e.g., via a DOCSIS upstream burst descriptor (e.g., an SCPI descriptor). The CM may transmit an upstream burst signal. The upstream burst signal may be transmitted by a CM at a determined time instant, e.g., periodically. The CM, e.g., via the upstream channel descriptor, may be directed to transmit the upstream burst signal by the CMTS 1416. The period and the characteristic of the burst may be determined by a service provider, e.g., in accordance with SCPI performance objectives.

As illustrated in FIG. 14(*b*), SCPI device 1410 may receive a CM signal burst, e.g., from CM A 1406. The SCPI device 1410 may determine that the received burst is a SCPI burst. A SCPI burst is a signal sent from the CM with characteristics that enable the SCPI device 1410 to distinguish the burst from other types of bursts and to permit the SCPI device 1410 to append signals for upstream transmission. The SCPI device 1410 may generate, append, and/or embed an SCPI information signal onto the CM signal, for example, as described herein. SCPI device 1410 may generate an embedded CM signal. The embedded CM signal may comprise a DOCSIS QAM preamble including notice of an imminent modulation change, e.g., followed by a payload in a modulation method of different type. SCPI device 1410 may send the upstream embedded CM signal to the CMTS 1416, the SCPI access point 1414 and the SCPI head end 1418. At CMTS 1416, the embedded CM signal may be ignored. At the SCPI head end 1418, the SCPI payload received via the upstream embedded CM signal may be recognized and processed. The SPI head end 1418 limy extract the SCPI information from the received upstream embedded CM signal. The SCPI information may be communicated to one or more of the VoIP gateway, a POTS gateway, or an Internet or other data gateway, for example, as illustrated in FIG. 9 and similarly in FIG. 10.

Figures 15, 16, 17:
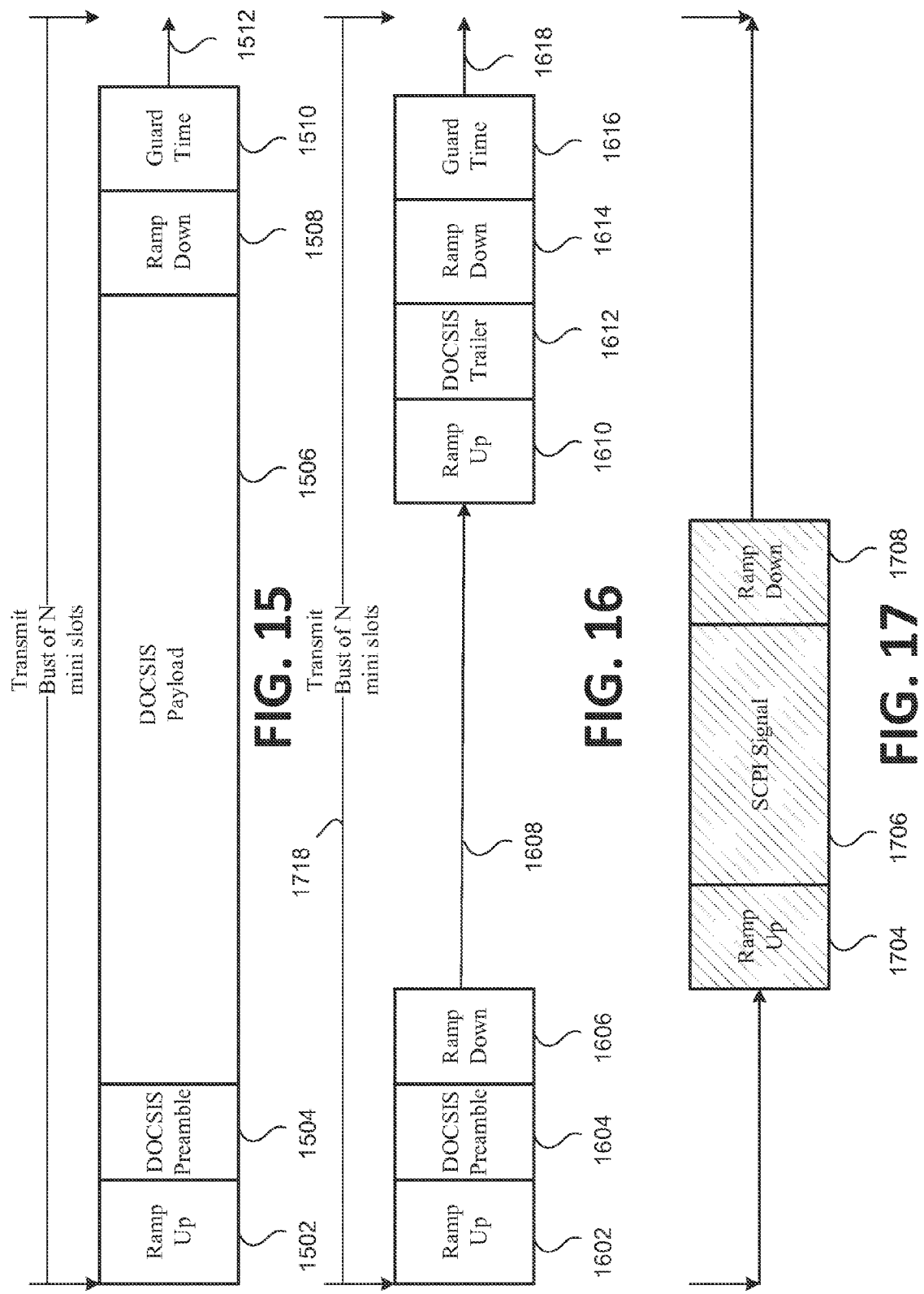
FIG. 15 is a signal diagram illustrating an upstream DOCSIS signal burst, e.g., from a CM to a CMTS.
FIG. 16 is a signal diagram illustrating a SCPI upstream signal burst from a CM to a SCPI device.
FIG. 17 is a signal diagram illustrating a SCPI upstream information signal.

FIG. 15 is a signal diagram illustrating an upstream DOCSIS burst, e.g., from a CM to a CMTS. As illustrated in FIG. 15, a DOCSIS transmit burst of, e.g., N mini slats duration may include a ramp up signal 1502, a DOCSIS preamble 1504, a DOCSIS payload 1506, a ramp down signal 1508 and a guard time 1510. The transmit burst may be followed by a silence period 1512.

FIG. 16 is a signal diagram illustrating a SCPI upstream burst sent from a CM to SCPI device. As illustrated in FIG. 16, the SCPI upstream burst, received by an SCPI device from a CM, may include a ramp up signal 1602, a DOCSIS preamble 1604, and a ramp down signal 1606. The DOCSIS preamble 1604 may include a notification of forthcoming modulation change. As illustrated in FIG. 16, the DOCSIS payload segment, e.g., as illustrated in FIG. 15 may be silent (e.g., for a silence period 1608). The silence period 1608 may be further followed by another ramp up 1610, a DOCSIS trailer 1612, a ramp down signal 1614, and a guard time 1616. The transmit burst may be followed by a silence period 1618.

FIG. 17 is a signal diagram illustrating a SCPI upstream information burst signal. This signal may be internal to an SCPI device. The SCPI upstream information burst signal may include an SCPI ramp up 1704, an SCPI signal 1706 and an SCPI ramp down 1708. The SCPI ramp up and SCPI ramp down signals and other characteristics of the SCPI signal may comply with DOCSIS requirements.

Figure 18:
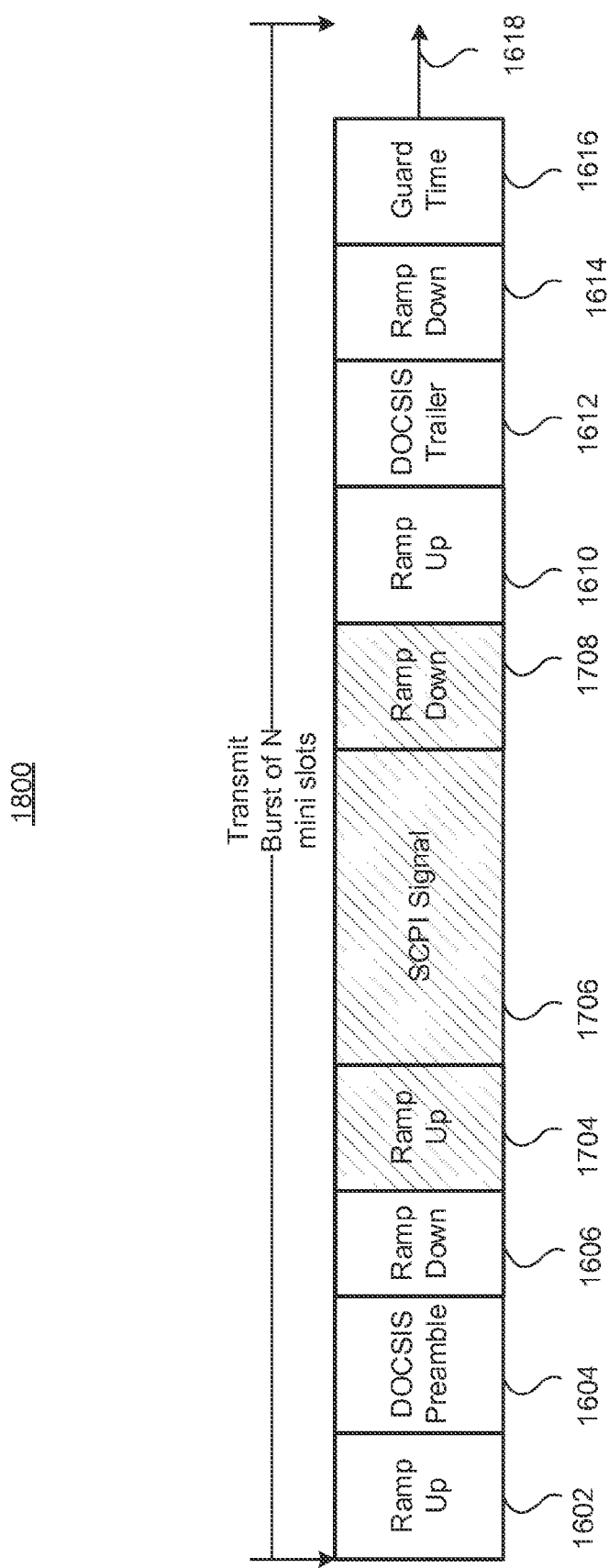
FIG. 18 is a signal diagram illustrating a composite upstream burst that may be sent by a SCPI device to a CMTS and/or the SCPI head end.

FIG. 18 is a signal diagram illustrating a composite upstream burst 1800 that may be sent by a SCPI device to a CMTS and/or the SCPI head end. As illustrated in FIG. 18, a SCPI device may insert the SCPI upstream information signal as illustrated in FIG. 17 into the SCPI upstream burst received by the SCPI device from a CM, as illustrated in FIG. 16. The SCPI device may send the composite upstream burst 1800 to an SCPI head end, e.g., via an SCPI access point.

Figure 19:
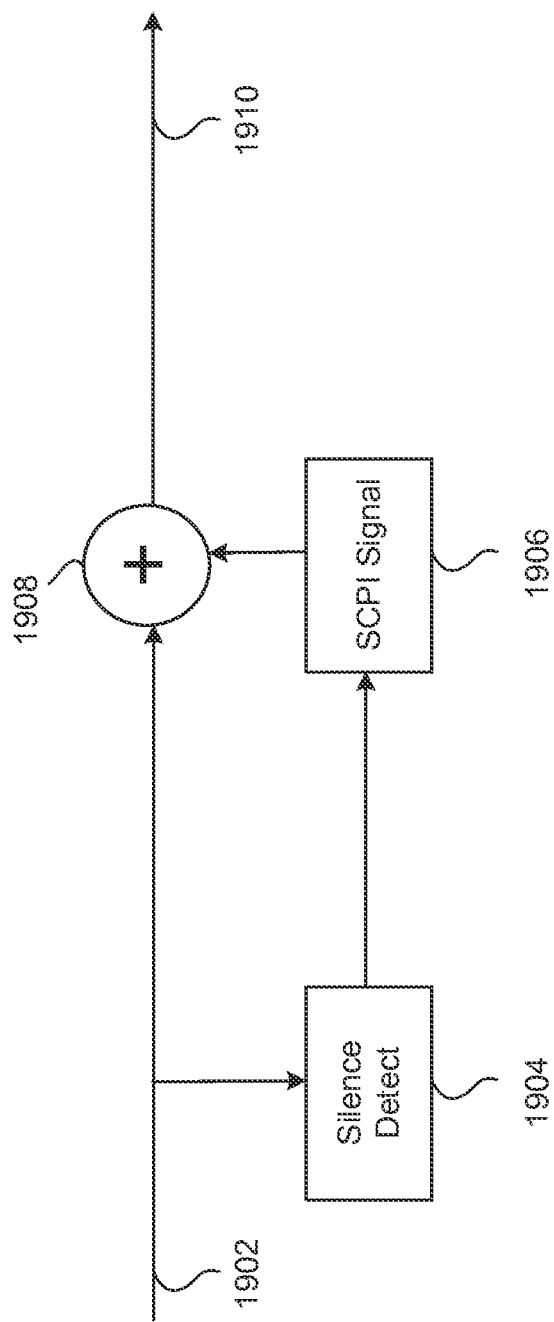
FIG. 19 is a state diagram illustrating an exemplary generation of the composite burst of FIG. 18.

FIG. 19 is a block diagram illustrating an exemplary generation of the composite burst of FIG. 18. As illustrated in FIG. 19, at 1902, an SCPI device may receive bursts from a CM. The SCPI device may create and/or store the SCPI signal representative of the SCPI information to be conveyed upstream. At 1904, the SCPI device may detect the CM signal payload silence, for example, as illustrated in FIG. 16. At 1908, the SCPI device may insert the SCPI signal 1906 (e.g., a stored SCPI signal) into the silent period, e.g., as illustrated in FIG. 18. At 1910, the SCPI device may send the composite burst signal to SCPI head end and/or CMTS. The detection and insertion may be accomplished in several ways, including ways that introduce no latency in the CM signal and cause no significant degradation of the CM signals. The composite upstream burst may be transmitted from the SCPI device toward the CMTS and the SCPI head end.

The upstream SCPI signal may include digital information associated with one or more of POTS signaling, digitized voice, data, SCPI device parameters, SCPI head end parameters, or other information necessary for SCPI system operation. For example, the other information necessary for SCPI system operation may include error detection and correction mechanisms. The information may be formulated into packets. Packetization of the information may be accomplished, e.g., at the SCPI device and/or at the SCPI head end.

The digital information may be converted into a signal that may be suitable for reliable communication from the SCPI device to the SCPI head end. The SCPI signal may be non-invasive to adjacent or accompanying DOCSIS signals. The SCPI signal may be detected (e.g., reliably detected) at the SCPI head end. The SCPI head end receiver be capable of detecting the SCPI signal without knowledge of the accompanying DOCSIS preamble and/or DOCSIS trailer. The frequency location, bandwidth, and/or power level of the SCPI signal may be within the limits of the DOCSIS signal.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims. Further, in the claims hereafter, the corresponding structures, materials, acts, and equivalents of all means or step plus function elements are intended to include any structure, material, or acts for performing the functions with other claimed elements as specifically claimed.

What is claimed:

1. A communication system comprising:
a cable modem(CM) coupled to a simple cable phone and internet (SCPI) device, wherein the SCPI device is capable of transmitting a first modulated signal that is addressed, via the SCPI device, to a cable modem termination system (CMTS), wherein the first modulated signal comprises a training signal, wherein the training signal comprises information indicating a forthcoming change to a second modulation, and information indicating a duration of a silence period;

the SCPI device capable of generating a transmission request;

the SCPI device capable of generating a combined signal by combining a second modulated signal with the first modulated signal, wherein the second modulated signal comprises information related to one or more of a plain old telephone service (POTS), a voice over IP (VOIP) phone, or a data device and wherein the second modulated signal is sent during the silence period;

the SCPI device capable of sending the combined signal to the CMTS and one or more SCPI head ends.

2. The system of claim 1, wherein the training signal is a DOCSIS preamble.

3. The system of claim 1, wherein the SCPI device is a master and each of the CMTS and SCPI head ends is a tributary.

* * * * *